US009928628B2

(12) United States Patent
Windmark et al.

(10) Patent No.: US 9,928,628 B2
(45) Date of Patent: Mar. 27, 2018

(54) METHOD, APPARATUS AND COMPUTER PROGRAM PRODUCT TO REPRESENT MOTION IN COMPOSITE IMAGES

(71) Applicant: Nokia Technologies Oy, Espoo (FI)

(72) Inventors: Johan Windmark, Lund (SE); Alexander Lindskog, Malmo (SE); Tobias Karlsson, Malmo (SE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/890,015

(22) PCT Filed: May 13, 2013

(86) PCT No.: PCT/FI2013/050515
§ 371 (c)(1),
(2) Date: Nov. 9, 2015

(87) PCT Pub. No.: WO2014/184417
PCT Pub. Date: Nov. 20, 2014

(65) Prior Publication Data
US 2016/0125633 A1  May 5, 2016

(51) Int. Cl.
*G06K 9/00* (2006.01)
*G06T 11/60* (2006.01)
(Continued)

(52) U.S. Cl.
CPC ............... *G06T 11/60* (2013.01); *G06K 9/46* (2013.01); *G06K 9/6267* (2013.01);
(Continued)

(58) Field of Classification Search
CPC ............................... G06T 11/60; G06K 9/6267
See application file for complete search history.

(56) References Cited

U.S. PATENT DOCUMENTS 6,514,081 B1   2/2003  Mengoli
7,702,131 B2   4/2010  Chinen et al.
(Continued)

FOREIGN PATENT DOCUMENTS

EP   1396818       3/2004
JP   2012-044380   3/2012

OTHER PUBLICATIONS

International Search Report and Written Opinion received for corresponding Patent Cooperation Treaty Application No. PCT/FI2013/050515, dated Mar. 12, 2014, 13 pages.
(Continued)

*Primary Examiner* — Oneal R Mistry
(74) *Attorney, Agent, or Firm* — Alston & Bird LLP

(57) ABSTRACT

In an example embodiment a method, apparatus and computer program product are provided. The method includes facilitating access of a plurality of images associated with a scene comprising at least one moving object, and segmenting the plurality of images into foreground regions and background regions based on changes in corresponding image regions between the images. The foreground regions comprise the at least one moving object. The method includes determining at least one object parameter associated with the at least one moving object in the foreground regions and generating a background image based on the background regions, and modifying at least one of the foreground regions and the background image to represent a motion of the at least one moving object based on the at least one object parameter. The method includes generating a composite image based on the modified at least one of the foreground regions and the background image.

19 Claims, 17 Drawing Sheets

(51) Int. Cl.

| | | |
|---|---|---|
| *G06T 3/40* | (2006.01) | |
| *H04N 5/262* | (2006.01) | |
| *G06K 9/46* | (2006.01) | |
| *G06K 9/62* | (2006.01) | |
| *G06T 3/00* | (2006.01) | |
| *G06T 7/33* | (2017.01) | |
| *G06T 7/73* | (2017.01) | |
| *G06T 7/11* | (2017.01) | |
| *G06T 7/215* | (2017.01) | |
| *G06T 7/246* | (2017.01) | |
| *G06T 7/194* | (2017.01) | |
| *H04N 21/8549* | (2011.01) | |

(52) U.S. Cl.
CPC .......... *G06T 3/0093* (2013.01); *G06T 3/4038* (2013.01); *G06T 7/11* (2017.01); *G06T 7/194* (2017.01); *G06T 7/215* (2017.01); *G06T 7/246* (2017.01); *G06T 7/33* (2017.01); *G06T 7/73* (2017.01); *H04N 5/2625* (2013.01); *G06K 2009/4666* (2013.01); *H04N 21/8549* (2013.01)

(56) References Cited

U.S. PATENT DOCUMENTS

| | | |
|---|---|---|
| 2003/0189588 A1 | 10/2003 | Girgensohn et al. |
| 2004/0017504 A1 | 1/2004 | Prandoni et al. |
| 2006/0034519 A1* | 2/2006 | Toyama ................... G06K 9/38 382/224 |
| 2006/0284976 A1 | 12/2006 | Girgensohn et al. |
| 2007/0040918 A1* | 2/2007 | Kondo ..................... G06T 5/50 348/241 |
| 2008/0123960 A1* | 5/2008 | Kim ........................ G06K 9/38 382/173 |
| 2009/0002517 A1* | 1/2009 | Yokomitsu ......... G06K 9/00771 348/223.1 |
| 2010/0166325 A1 | 7/2010 | Sengamedu et al. |
| 2012/0069222 A1 | 3/2012 | Steinberg et al. |
| 2015/0221096 A1* | 8/2015 | Gefen ................... G06T 7/2093 382/103 |

OTHER PUBLICATIONS

Teramoto, O. et al, *Interactive Motion Photography from a Single Image*, Retrieved from the Internet [May 30, 2017]: <URL: http://www-ui.is.s.u-tokyo.ac.jp/~rakeo/papers/teramoto_visualcomputer2009_motionphotography.pdf>. (undated) 10 pages.

\* cited by examiner

METHOD, APPARATUS AND COMPUTER PROGRAM PRODUCT TO REPRESENT MOTION IN COMPOSITE IMAGES

RELATED APPLICATION

This application was originally filed as Patent Cooperation Treaty Application No PCT/FI2013/050515 filed May 13, 2013.

TECHNICAL FIELD

Various implementations relate generally to method, apparatus, and computer program product to represent motion in composite images.

BACKGROUND

Various electronic devices such as cameras, mobile phones, and other devices are widely used for capturing image of a scene. Although, electronics devices such as high-end digital cameras have evolved to provide various enhancements on the captured images and post capture processing of the image. However, majority of the images fail to represent the ambience in the scene, and more so, if there are movement of objects in the scene. For instance, an image capture of a playground by the existing digital cameras may not accurately provide an impression of movement of players and other objects. The recent advancements in technology have enabled digital cameras to capture multiple images depicting a scene in quick succession. However, a viewer will have to view the entire sequence of images to know the action and ambience in the scene. It is a challenge to capture and accentuate the action in the scene.

SUMMARY OF SOME EMBODIMENTS

Various aspects of examples embodiments are set out in the claims.

In a first aspect, there is provided a method comprising: facilitating access of a plurality of images associated with a scene, the scene comprising at least one moving object; segmenting the plurality of images into foreground regions and background regions based on changes in corresponding image regions between the plurality of images, wherein the foreground regions comprise the at least one moving object; determining at least one object parameter associated with the at least one moving object in the foreground regions; generating a background image based on the background regions; modifying at least one of the foreground regions and the background image to represent a motion of the at least one moving object based on the at least one object parameter; and generating a composite image based on the modified at least one of the foreground regions and the background image.

In a second aspect, there is provided an apparatus comprising at least one processor; and at least one memory comprising computer program code, the at least one memory and the computer program code configured to, with the at least one processor, cause the apparatus to perform at least: facilitate access of a plurality of images associated with a scene, the scene comprising at least one moving object; segment the plurality of images into foreground regions and background regions based on changes in corresponding image regions between the plurality of images, wherein the foreground regions comprise the at least one moving object; determine at least one object parameter associated with the at least one moving object in the foreground regions; generate a background image based on the background regions; modify at least one of the foreground regions and the background image to represent a motion of the at least one moving object based on the at least one object parameter; and generate a composite image based on the modified at least one of the foreground regions and the background image.

In a third aspect, there is provided a computer program product comprising at least one computer-readable storage medium, the computer-readable storage medium comprising a set of instructions, which, when executed by one or more processors, cause an apparatus to perform at least: facilitate access of a plurality of images associated with a scene, the scene comprising at least one moving object; segment the plurality of images into foreground regions and background regions based on changes in corresponding image regions between the plurality of images, wherein the foreground regions comprise the at least one moving object; determine at least one object parameter associated with the at least one moving object in the foreground regions; generate a background image based on the background regions; modify at least one of the foreground regions and the background image to represent a motion of the at least one moving object based on the at least one object parameter; and generate a composite image based on the modified at least one of the foreground regions and the background image.

In a fourth aspect, there is provided an apparatus comprising: means for facilitating access of a plurality of images associated with a scene, the scene comprising at least one moving object; means for segmenting the plurality of images into foreground regions and background regions based on changes in corresponding image regions between the plurality of images, wherein the foreground regions comprise the at least one moving object; means for determining at least one object parameter associated with the at least one moving object in the foreground regions; means for generating a background image based on the background regions; means for modifying at least one of the foreground regions and the background image to represent a motion of the at least one moving object based on the at least one object parameter; and means for generating a composite image based on the modified at least one of the foreground regions and the background image.

In a fifth aspect, there is provided a computer program comprising program instructions which when executed by an apparatus, cause the apparatus to: facilitate access of a plurality of images associated with a scene, the scene comprising at least one moving object; segment the plurality of images into foreground regions and background regions based on changes in corresponding image regions between the plurality of images, wherein the foreground regions comprise the at least one moving object; determine at least one object parameter associated with the at least one moving object in the foreground regions; generate a background image based on the background regions; modify at least one of the foreground regions and the background image to represent a motion of the at least one moving object based on the at least one object parameter; and generate a composite image based on the modified at least one of the foreground regions and the background image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 17 of the drawings.

Figure 1:
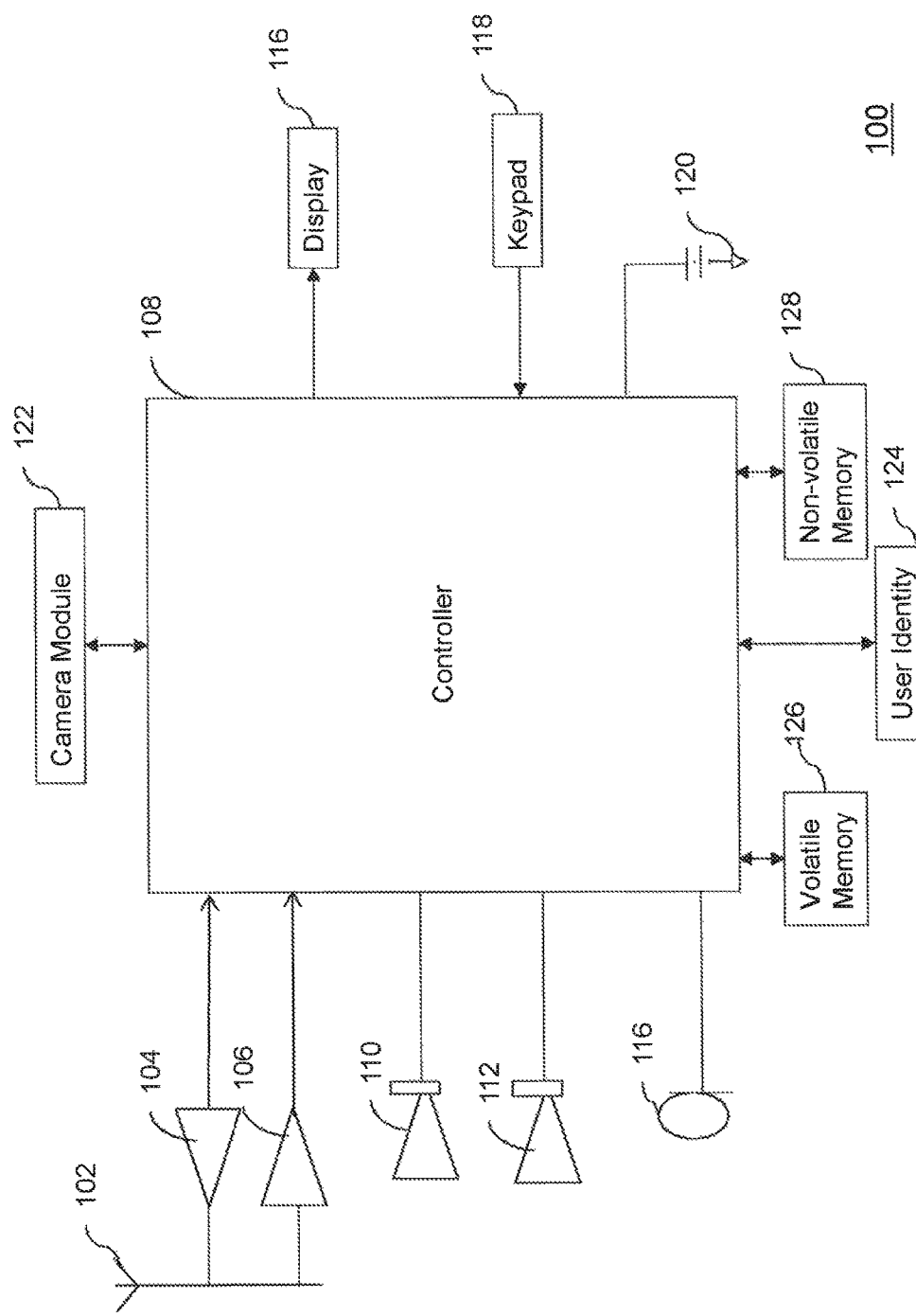
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
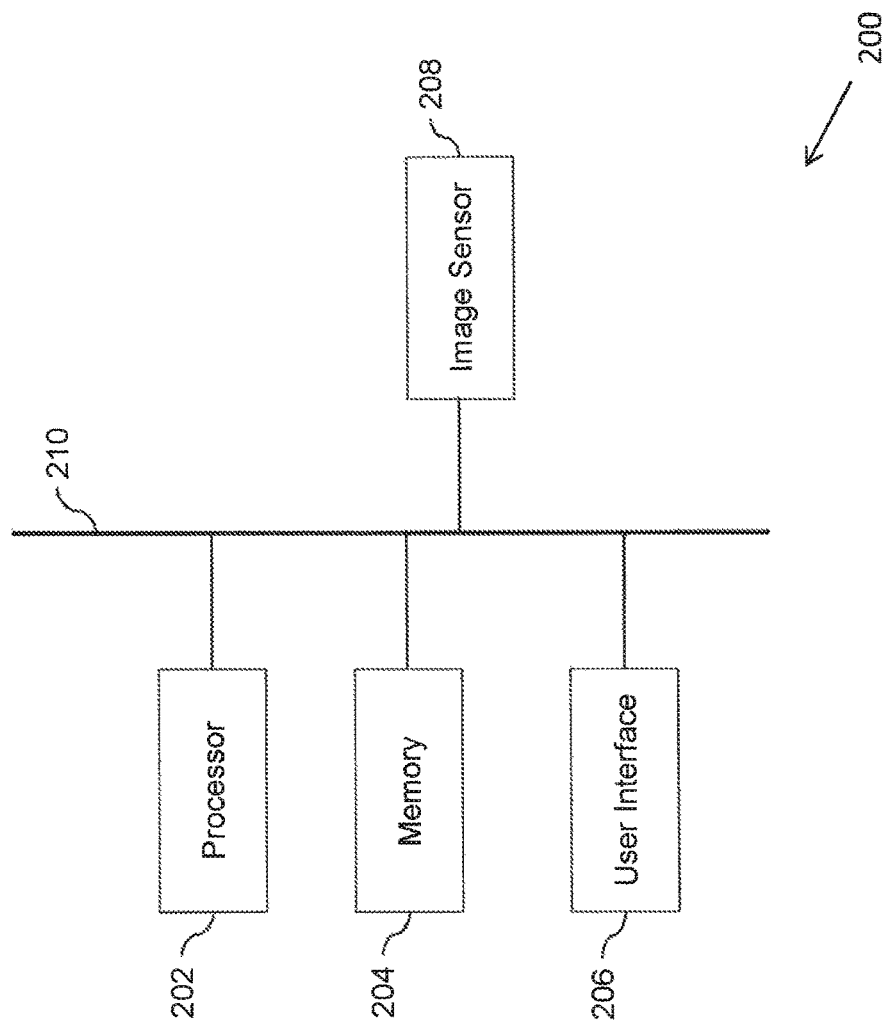
FIG. 2 illustrates an apparatus for representing motion in composite image, in accordance with an example embodiment.

FIG. 2 illustrates an apparatus 200 for representing motion of objects in a composite image, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, alongwith other components may also be configured to capture a plurality of images depicting a scene.

These components (202-208) may communicate to each other via a centralized circuit system 210 to represent motion in a composite image. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate access of a plurality of images associated with a scene, where the scene comprises at least one moving object. An example of the scene may include any visible setup or arrangement of objects such that a corresponding image/video of the scene can be captured by a media capturing module, such as the camera module 122, where at least one object visible in the scene may be in motion. For instance, the scene may include an object, such as, an athlete running on a track and various images may be captured of the scene, where the athlete may be shown at different positions in different images of the scene. In some example embodiments, the apparatus 200 may be caused to capture the plurality of images of the scene. Alternatively, in some other example embodiments, plurality of images may be prerecorded or stored in an apparatus 200, or may be received from sources external to the apparatus 200. In such example embodiments, the apparatus 200 is caused to receive the plurality of images from external storage medium such as DVD, Compact Disk (CD), flash drive, memory card, or received from external storage locations through Internet, Bluetooth®, and the like. In a representation, a plurality of images (I1, I2 . . . In, where n being a natural number) may be accessed to depict a scene comprising at least one moving object. In an example embodiment, the images (I1, I2, . . . , In) are captured having same or substantially same background for each of the images (I1, I2, . . . , In). In an example embodiment, a processing means may be configured to facilitate access of the plurality of images associated with the scene. An example of the processing means may include the processor 202, which may be an example of the controller 108, and/or the image sensor 208.

In an example embodiment, the processor 202 is configured to, with the content of the memory 204, and optionally with other components described herein, to cause the apparatus 200 to segment the plurality of images (I1, I2, . . . , In) into foreground regions and background regions based on changes in corresponding image regions between the plurality of images (I1, I2, . . . , In). In an example embodiment, the foreground regions comprise the at least one moving object. In an example embodiment, the plurality of images (I1, I2, . . . , In) are aligned and the segmentation of the plurality of images (I1, I2, . . . , In) is performed on the plurality of aligned images. In an example embodiment, the apparatus 200 is configured to determine a number of point correspondences between a pair of images, such as between the images I1 and I2, the images I1 and I3, etc. In an example embodiment, the apparatus 200 is further caused to determine a transformation matrix based on the point correspondences between the image pairs, such as the image pairs (I1 and I2). The images I1 and I2 are aligned to a common coordinate system based on the transformation matrix to have a same background of the images I1 and I2. It should be noted that the apparatus 200 is caused to align each of the images (I1, I2, . . . , In) to the common coordinate system.

In an example embodiment, the apparatus 200 is caused to determine at least one image region in the image (I1) comprising a change with respect to a corresponding image region in at least one image, such as, an image I2 of the plurality of images (I1, I2, . . . , In). In an example, each image of the plurality of images (I1, I2, . . . , In) may have 'm' number of regions, for instance, the image I1 may have 'm' number of regions (R1, R2, . . . Rm). It may be determined that the region R2 of the image I1 is different from the corresponding region R2 in the remaining images (I2 . . . , In), it may represent that the region R2 of the image I1 may have at least one moving object that may have moved to a different region in the remaining images, for example, to the region R3 in the image I2. In an example embodiment, a processing means may be configured to segment the plurality of images (I1, I2, . . . , In) into foreground regions and background regions. An example of the processing means may include the processor 202, which may be an example of the controller 108.

In an example embodiment, segmentation of the images (I1, I2, . . . , In) may be performed by matching corresponding regions in the images (I1, I2, . . . , In) by pixel matching and/or block wise matching. In an example embodiment, the region R2 of the image I1 that has a change with respect to the corresponding region R2 of the image I2, may be determined by matching some pixels of the region R2 in the image I1 to corresponding pixels of the region R2 in the image I2. In another example embodiment, a change in two corresponding regions in the images I1 and I2 may be determined by matching all pixels of the region R2 of the images I1 and I2. Some examples of segmentation of the images (I1, I2, . . . In) into background regions and foreground regions may include, but are not limited to, mean image method, median image method, mean shift method and/or other segmentation methods such as eigen background method and the like.

In an example embodiment, the processor 202 is configured to, with the content of the memory 204, and optionally with other components described herein, to cause the apparatus 200 to classify the at least one image region in an image as the foreground region of the image if there are changes in the at least one image region with respect to corresponding at least one image region in one or more of the remaining images. In another example embodiment, a region in an image may be classified as the foreground region, if the corresponding region in each of the remaining images does not match with the region in the image. In an example embodiment, the foreground regions in some or all of the plurality of images are classified. For example, the apparatus 200 may classify the region R2 of the image I1 and the region R3 of the image I2 as foreground regions representing the at least one moving object in the images I1 and I2, respectively. In another example, the regions R2 and R3 in each of the images I1 and I2 may also be classified as foreground regions. It should be noted that the foreground regions of the other images such as images (I3, I4 . . . , In) are also classified based on determining changes in their image regions with respect to the corresponding regions in other images. In an example embodiment, a processing means may be configured to classify the at least one image region in an image as the foreground region of the image if there are changes in the at least one image region with respect to corresponding at least one image region in another image. An example of the processing means may include the processor 202, which may be an example of the controller 108.

In an example embodiment, the processor 202 is configured to, with the content of the memory 204, and optionally with other components described herein, to cause the apparatus 200 to classify remaining image regions of the image (I1) (the regions that have no changes with respect to corresponding regions in some or all of the remaining images (I2, I3 . . . , In) as the background regions of the image (I1). Similarly, the apparatus 200 is caused to determine background regions in one or more of the other images such as images (I2, I3, . . . , In). For instance, the regions that are unchanged in the images (I1, I2, . . . , In) are classified as background regions. For example, if the region R2 represents a foreground region in the image I1, the region R3 represents a foreground region in the image I2 and a region R4 represents a foreground region in an image I3, the regions (R1, R5, R6, R7 and R8) remain unchanged in the images (I1, I2, I3). In this example, the regions (R1, R5, R6, R7 and R8) are classified as background regions. In an example embodiment, a processing means may be configured to classify remaining image regions as the background region of the image. An example of the processing means may include the processor 202, which may be an example of the controller 108.

For example, a scene depicting a rabbit hopping to different positions in a forest may be captured in images (I1, I2 and I3), where the rabbit may have different positions in the images (I1, I2 and I3). In an example embodiment, the apparatus 200 determines the regions (that have changes if compared between two images) that represent the rabbit in the images (I1, I2 and I3). The regions representing the rabbit in the images (I1, I2 and I3) are classified as foreground regions. For instance, a region R1 in the image I1, a region R3 in the image I2 and a region R5 in the image I3 represent the foreground regions. In an example embodiment, remaining regions (R2, R4 and R6) in the images (I1, I2 and I3) that remain unchanged are classified as background regions. In this example, the background regions may depict stationary objects like trees in the forest.

In an example embodiment, the processor 202 is configured to, with the content of the memory 204, and optionally with other components described herein, to cause the apparatus 200 to determine at least one object parameter associated with the at least one moving object in the foreground regions. In an example embodiment, foreground regions, such as R2 in the image I1 (obtained based on segmentation) are used to determine at least one object parameter associated with the at least one moving object. In an example embodiment, the at least one object parameter provides details associated with the at least one moving object, such as, location of the at least one moving object and/or the area occupied by the at least one moving object in the image (I1). Examples of the object parameters in the plurality of images may include, but are not limited to, object location, object shape, area occupied by object and/or other parameters such as pixel composition, pixel intensity associated with the moving objects in the images (I1, I2, . . . , In). In an example embodiment, a processing means may be configured to determine at least one object parameter associated with the at least one moving object in the foreground regions. An example of the processing means may include the processor 202, which may be an example of the controller 108.

In an example embodiment, the processor 202 is configured to, with the content of the memory 204, and optionally with other components described herein, to cause the apparatus 200 to generate a background image based on the background regions. For instance, some or all of the plurality of images (I1, I2, . . . , In) have stationary objects classified as background regions based on the segmentation of the images (I1, I2, . . . , In). In an example embodiment, the apparatus 200 combines the regions (R1, R5, R6, R7 and R8) in the images (I1, I2 and I3), classified as background regions (that are unchanged in the images I1, I2 and I3) to generate the background image. In another example, the scene depicting the rabbit hopping to different positions in the forest, represented by the images (I1, I2 and I3), regions (R2, R4 and R6) are classified as background regions. In an example embodiment, the apparatus 200 combines the regions R2, R4 and R6 to generate a background image of the scene in the forest. In an example embodiment, a processing means may be configured to generate a background image based on the background regions. An example of the processing means may include the processor 202, which may be an example of the controller 108.

In various example embodiments, at least one of the foreground regions and background image may be modified in variety of ways to represent motion in a composite image (that is a still image). In an example embodiment, the processor 202 is configured to, with the content of the memory 204, and optionally with other components described herein, to cause the apparatus 200 to modify at least one of the foreground regions and the background image to represent a motion of the at least one moving object based on the at least one object parameter. For instance, a moving object, classified as a foreground region (R2) in the image (I1) and a foreground region (R3) in the image (I2) are modified to represent motion by applying effects and/or filters to the foreground regions (R2) and (R3). Alternatively, the background image is also modified by selectively applying effects and/or filters to the background image and/or the foreground regions to represent motion. Examples of selectively modifying the foreground region and the background image may include, but are not limited to, size alteration, cropping, selective color change, change in orientation, introducing distortion, blurring, enhancing, sharpening and/or other effects such as selectively applying special effects, changing color depth, changing contrast and color adjustments. In an example embodiment, the foreground regions representing the rabbit may be selectively blurred or the background image depicting the forest alone is blurred to show the motion of the rabbit. Alternatively, selective regions of both of the foreground regions and the background image may also be blurred. In an example embodiment, the blurring operation includes the calculation of a blur length and a blur angle from the object parameters of the foreground regions, and blurring of the regions may be performed based on the blur length and the blur angle. In an example embodiment, a processing means may be configured to modify at least one of the foreground regions and the background image to represent a motion of the at least one moving object based on the at least one object parameter. An example of the processing means may include the processor 202, which may be an example of the controller 108.

In an example embodiment, the apparatus 200 is caused to generate a composite image based on the modified at least one of the foreground regions and the background image. For example, blurred foreground regions representing the rabbit may be combined with the background image to generate a composite image. In another example, the foreground regions representing the rabbit may be combined with the background image that is blurred to generate a composite image. In another example, the blurred foreground regions and the blurred background image may be combined to generate a composite image depicting motion of the rabbit. In an example embodiment, at least one of the foreground region (R2) of the image (I1) that is modified by applying effects and/or the background image are combined to generate a composite image that represents the motion of at least one moving object from the plurality of images (I1, I2, . . . , In) in the composite image. For example, at least one of the foreground regions (R1, R3 and R5) that is selectively blurred, representing the rabbit is combined with a background image (generated from the regions R2, R4 and R6 of the images (I1, I2 and I3), to generate a composite image. Alternatively, the background image (generated from the regions R2, R4 and R6 of the images I1, I2 and I3) that is blurred is combined with the foreground regions (R1, R3 and R5) representing the rabbit, to depict motion of the rabbit in a composite image. In an example embodiment, at least one of the foreground regions (R1, R3 and R5) that is blurred is combined with the background image (generated from the regions R2, R4 and R6 of the images I1, I2 and I3) that has also been blurred to generate a composite image.

Some example embodiments of the generation of images representing motion in still images are further described in reference to FIGS. 3-17, and these FIGS. 3-17 represent one or more example embodiments only, and should not be considered limiting to the scope of the various example embodiments.

Figure 3:
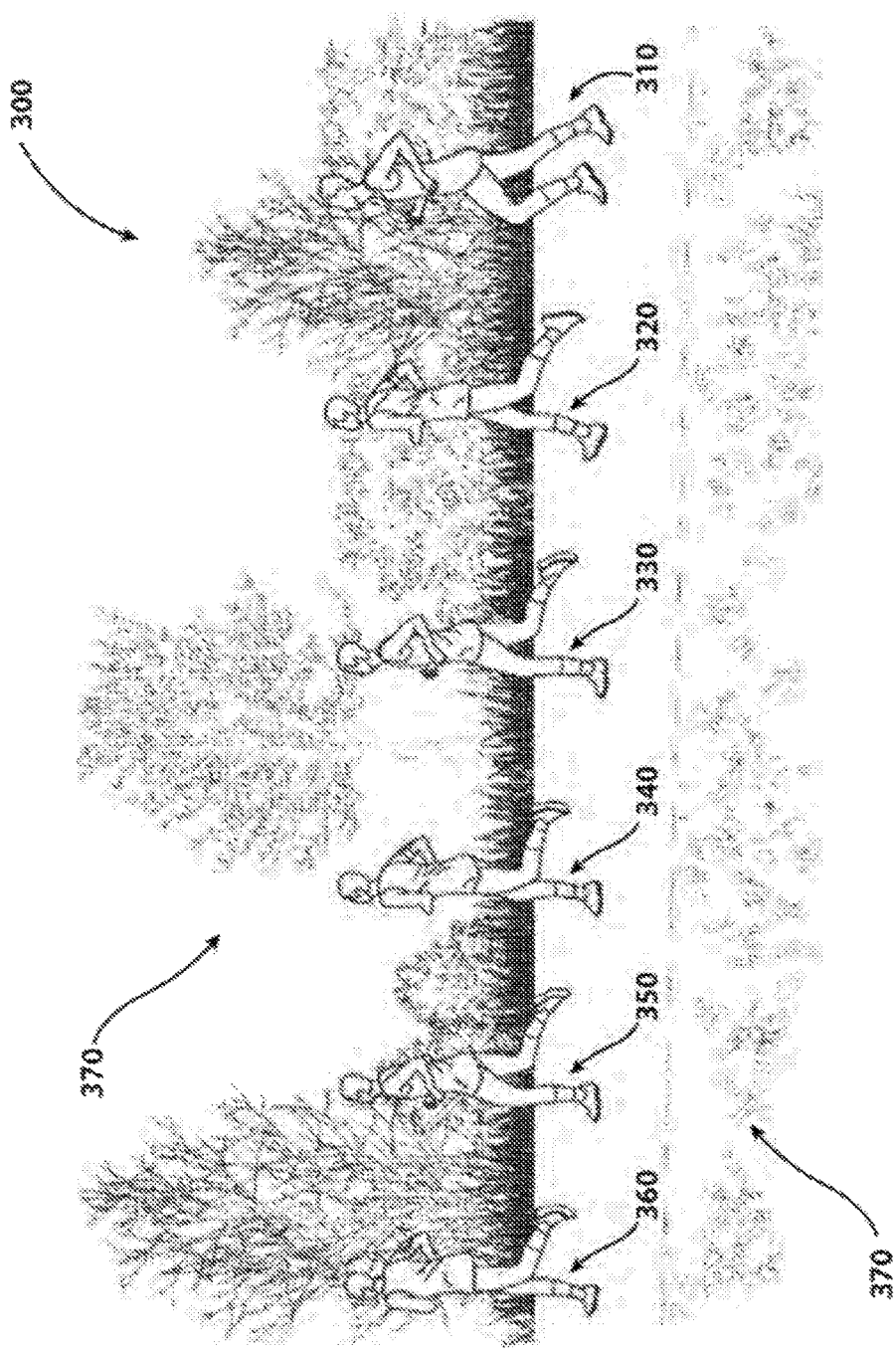
FIG. 3 represents an example of a composite image generated from a plurality of images.

FIG. 3 represents an example of a composite image 300 generated from a plurality of images (I1, I2, . . . , I6). The composite image 300 shows a single image showing various instances of an athlete at different positions in a scene. The composite image 300 may be formed based on combining various images of the scene, where the athlete may be at different positions in different images. In an example embodiment, the plurality of images (I1, I2, . . . , I6) may be captured by an apparatus such as the apparatus 200. For instance, the apparatus 200 may include a media capturing device that is capable of capturing the plurality of images (I1, I2, . . . , I6). Alternatively or additionally, the plurality of images (I1, I2, . . . , I6) may be prerecorded, stored in an apparatus 200, or may be received from sources external to the apparatus 200. The plurality of images (I1, I2, . . . , I6) are segmented into foreground regions, depicting a moving object (athlete) and background regions (for example, track, tree, buildings, etc.) representing stationary objects that do not change position in the plurality of images (I1, I2, . . . , I6). In an example, foreground regions (310, 320, 330, 340, 350 and 360) represent the moving object (for example, the athlete) that changes position from one region to another region in the images (I1, I2, . . . I6). For example, the athlete may be present at the region 310 in the image I1 (not shown), at the region 320 in the image I2 (not shown), at the region 330 in the image I3 (not shown), at the region 340 in the image I4 (not shown), at the region 350 in the image I5 (not shown) and at the region 360 in the image I6 (not shown), whereas the background region for each of the images (I1, I2, . . . , I6) are fixed. In an example embodiment, the background image 370 (representing the track, trees and the buildings) may be generated from the stationary objects classified as background regions in the plurality of images (I1, I2, . . . , I6). The foreground regions (310, 320, 330, 340, 350 and 360) representing the athlete in various positions in the plurality of images (I1, I2, . . . , I6) are combined with the background image 370 (generated from the background regions of images (I1, I2, . . . , I6) to form the composite image 300.

Figure 4:
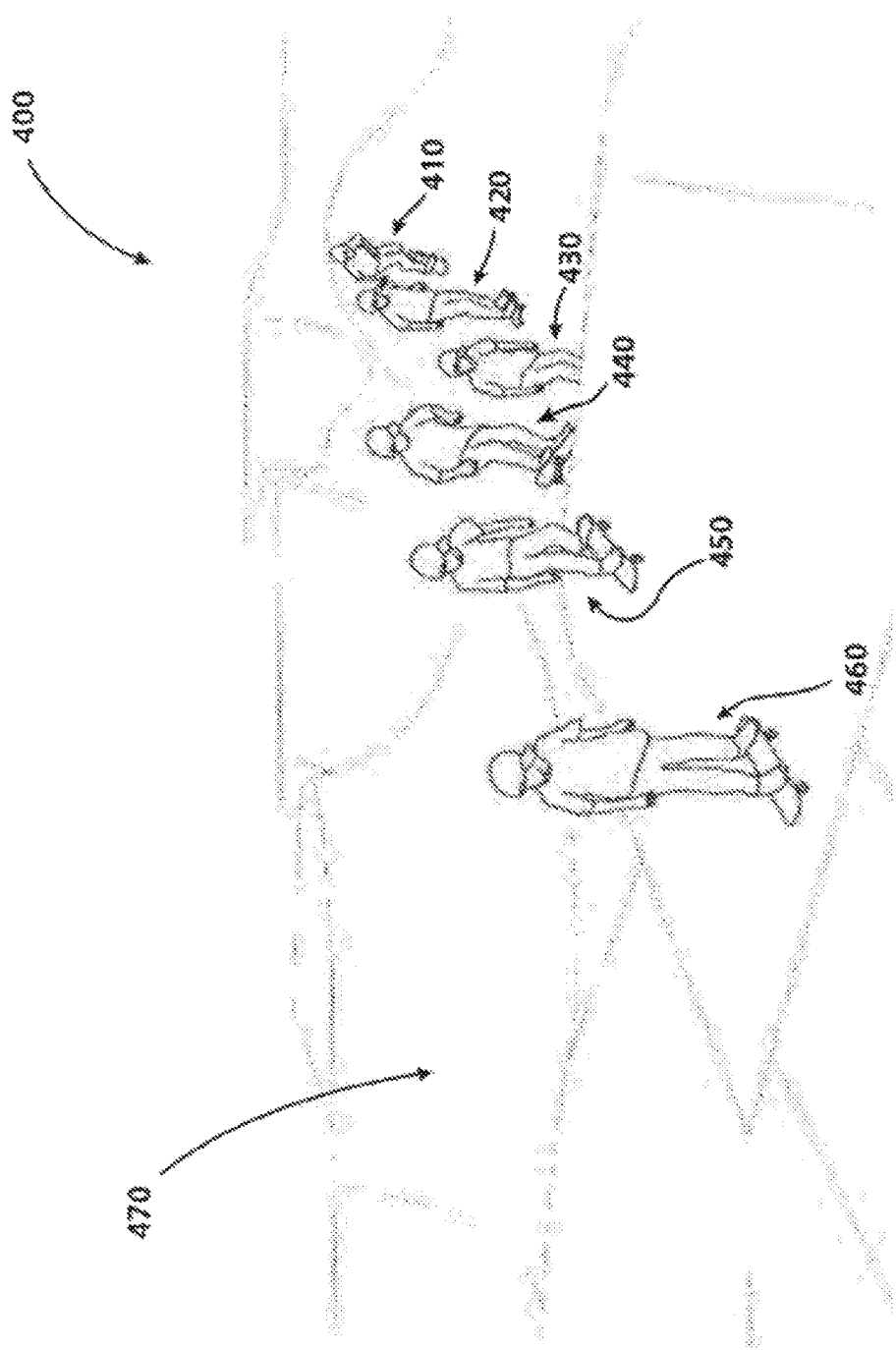
FIG. 4 represents another example of a composite image generated from a plurality of images.

FIG. 4 represents another example of a composite image 400 generated from a plurality of images (C1, C2, . . . , C6). The composite image 400 shows an image showing various instances of a skater at different positions in a scene captured using a media capturing device, for example, the camera module 122. The composite image 400 may be formed based on combining various images of the scene, where the skater may be at different positions in different images. The plurality of images (C1, C2, . . . , C6) are segmented into foreground regions, depicting a moving object (skater) and background regions (for example, uneven surface, buildings, etc.) representing stationary objects that do not change position in the plurality of images (C1, C2, . . . , C6). In an example, foreground regions (410, 420, 430, 440, 450 and 460) represent the moving object (for example, the skater) that changes position from one region to another region in the images (C1, C2 . . . , C6). For example, the skater may be present at the region 410 in the image C1 (not shown), at the region 420 in the image C2 (not shown), at the region 430 in the image C3 (not shown), at the region 440 in the image C4 (not shown), at the region 450 in the image C5 (not shown) and at the region 460 in the image C6 (not shown), whereas the background region for each of the images (C1, C2, . . . , C6) are fixed. In an example embodiment, the background image 470 (representing the uneven surface and the buildings) may be generated from the stationary objects classified as background regions in the plurality of images (C1, C2, . . . , C6). The foreground regions (410, 420, 430, 440, 450 and 460) representing the skater in various positions in the plurality of images (C1, C2, . . . , C6) are combined with the background image 470 (generated from the background regions of images (C1, C2, . . . , C6) to form the composite image 400.

Figure 5:
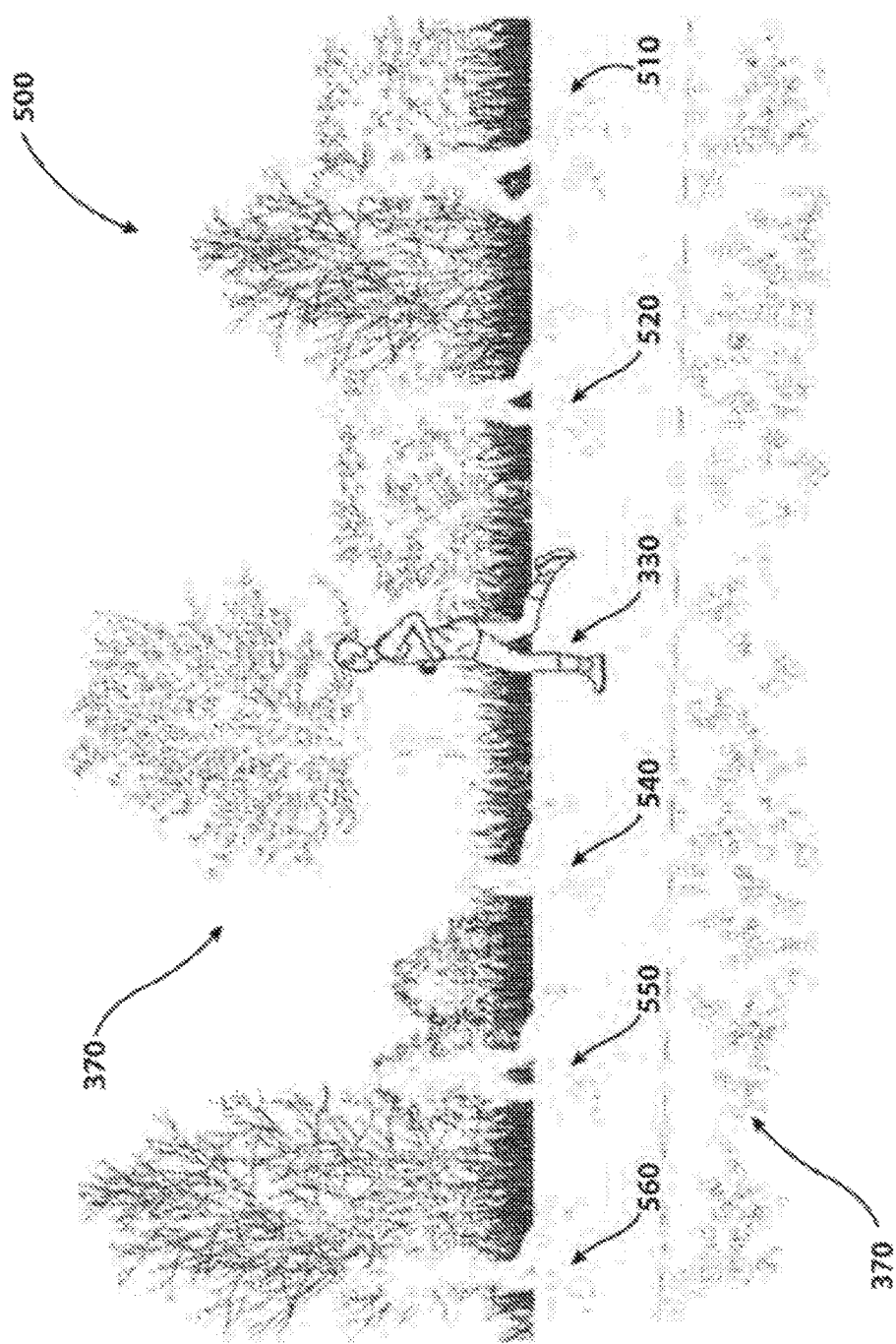
FIG. 5 illustrates an example representation of a composite image representing motion of objects, in accordance with an example embodiment.

FIG. 5 illustrates an example representation of a composite image 500 representing motion of objects, in accordance with an example embodiment. In an example embodiment, the composite image 500 is generated based on selectively modifying the foreground regions (310, 320, 330, 340, 350 and 360) of the composite image 300. For instance, some foreground regions such as 310, 320, 340, 350 and 360 are blurred to obtain foreground regions (510, 520, 330, 540, 550 and 560) and the foreground region 330 is unchanged. In an example embodiment, the foreground regions are blurred based on the object parameters determined from the foreground regions (310, 320, 340, 350 and 360). In this example embodiment, background image 370 is same as shown in the composite image 300. It should be noted that motion of a moving object (for example, the athlete) is represented by blurred foreground regions (510, 520, 540, 550 and 560) and details of the object is represented by maintaining the foreground region (330) unchanged, thereby representing the motion of moving object in the foreground regions (510, 520, 330, 540, 550 and 560) of the composite image 500. In an example embodiment, the foreground regions (510, 520, 540, 550 and 560) that are blurred and the foreground region (330) that is unchanged, are combined with the background image 370 (that is unchanged) to generate the composite image 500. As shown in FIG. 5, only one region (for example, the region 330) associated with the moving object is unchanged, however, it should be noted that all foreground regions may be blurred or some selective foreground regions may be blurred or foreground regions may be blurred in a particular pattern, for example, blurring of alternate foreground regions. In an alternate example embodiment, some or all of the foreground regions may be processed to generate a composite image such as the composite image 500 to represent the moving object.

Figure 6:
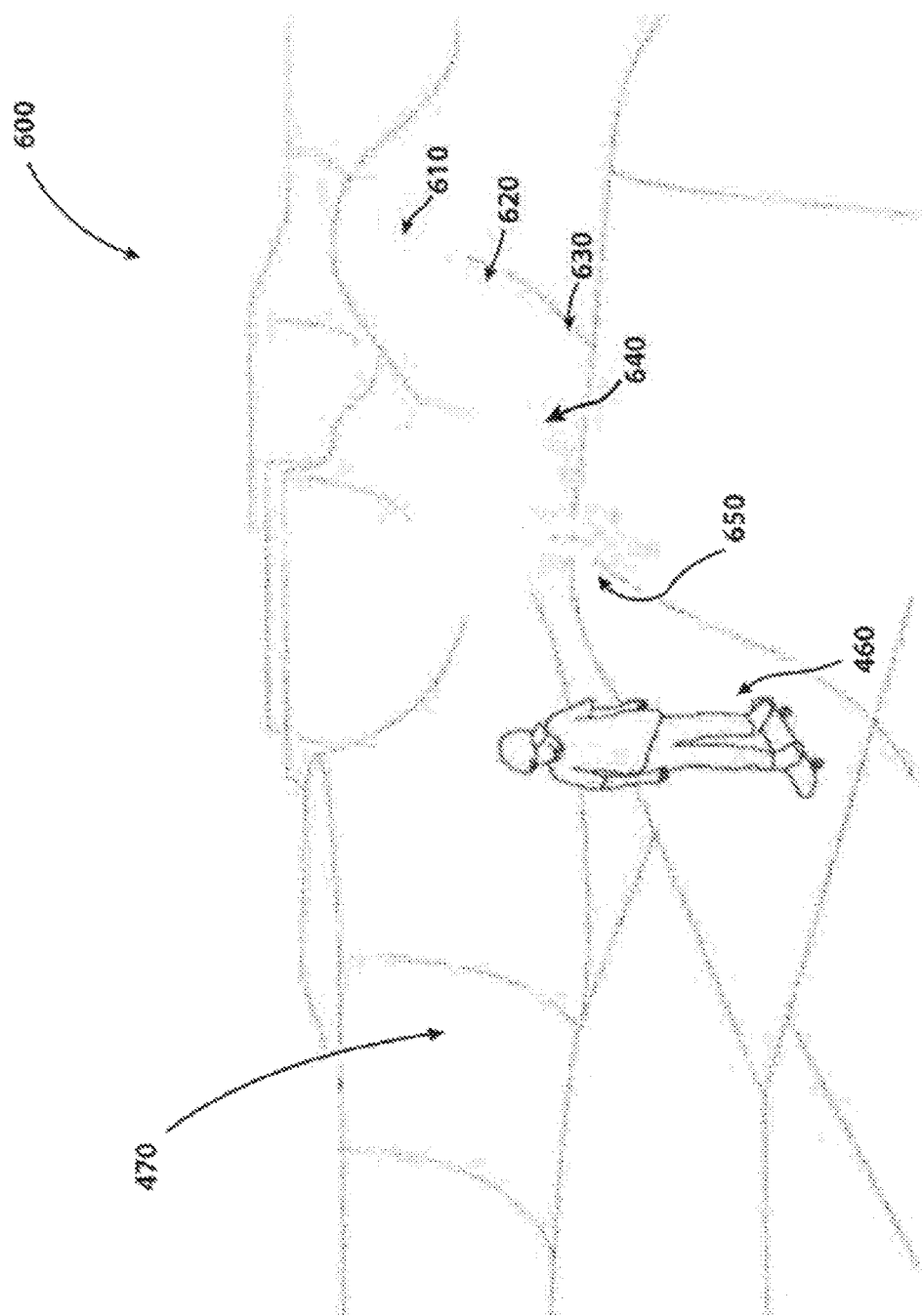
FIG. 6 illustrates an example representation of a composite image representing motion of objects, in accordance with another example embodiment.

FIG. 6 illustrates an example representation of a composite image 600 representing motion of objects, in accordance with another example embodiment. In an example embodiment, the composite image 600 is generated by selectively modifying the foreground regions (410, 420, 430, 440, 450 and 460) of the composite image 400. In this embodiment, a directional blur of varying intensity is applied to the foreground regions (410, 420, 430, 440 and 450) to obtain foreground regions (610, 620, 630, 640 and 650) that depict changes in speed of a moving object (for example, a skater) and the foreground region 460 is unchanged. In an example embodiment, varying intensity blur is applied to the foreground regions (410, 420, 430, 440 and 450) based on a length and a direction of the foreground regions (410, 420, 430, 440 and 450) in the plurality of images (C1, C2, . . . , C6). In an example embodiment, intensity of blurring a foreground region is based on the distances between the foreground region and other neighboring foreground regions. For example, the foreground region 610 has a neighboring foreground region, for example, the foreground region 620 and is separated by a length 'L1' from the foreground region 610. In this example, the foreground region 610 is blurred with an intensity proportional to the length 'L1'. For instance, if the length 'L1' increases, the intensity level of blurring the foreground region 610 also increases. In another example, the foreground region 620 is separated by a length 'L2' from the foreground region 630 and the length 'L1' from the foreground region 610, the foreground region 620 is blurred with an intensity proportional to an average length of the length 'L1' and the length 'L2'. The background image 470 in the composite image 600 is the same as that of the composite image 400. The modified foreground regions (610, 620, 630, 640 and 650) and the unchanged foreground region (460) are combined with the unchanged background image (470) to generate the composite image 600. The blurred foreground regions (610,

620, 630, 640 and 650) with varying intensity provides a visualization of the moving object with varying speed. It should be noted that only the foreground region 460 is kept unchanged in the composite image 600 to represent details of the moving object. However, it should be noted that all foreground regions may be blurred or some selective foreground regions may be blurred or foreground regions may be blurred in a particular pattern, for example, blurring of alternate foreground regions. In an alternate example embodiment, some or all of the foreground regions may be processed to generate a composite image such as the composite image 600 to represent the moving object with varying speed.

Figure 7:
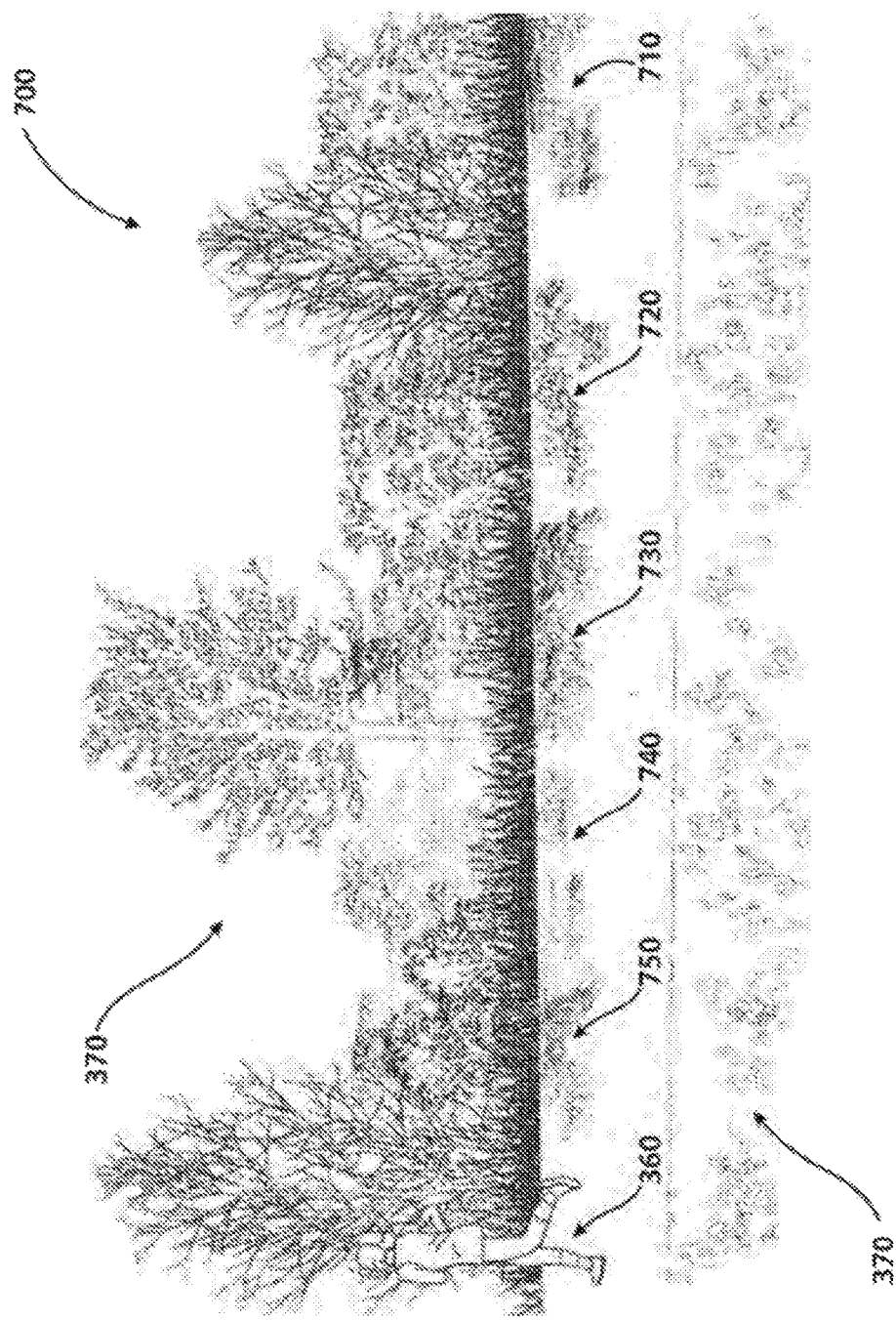
FIG. 7 illustrates an example representation of a composite image representing motion of objects, in accordance with another example embodiment.

FIG. 7 illustrates an example representation of a composite image 700 representing motion of objects, in accordance with another example embodiment. The composite image 700 is generated by modifying foreground regions (310, 320, 330, 340, 350 and 360) of the composite image 300 to show the motion of a moving object having a significant speed. In an example embodiment, a path guided luminosity integration may be performed on selected foreground regions such as the regions (310, 320, 330, 340 and 350), and keeping an instance of the moving object (for example, the region 360) unchanged, to represent a significant speed of the moving object. The modified foreground regions (710, 720, 730, 740 and 750) with the unchanged foreground region (360) are combined with the unchanged background image (370) to generate the composite image 700. In an example embodiment, an illusionary effect of high speed of the moving object (shown by the foreground region 360) may also be achieved by applying extreme motion blur emulation to the selected foreground regions such as the foreground regions (310, 320, 330, 340 and 350) based on object parameters determined from the foreground regions (310, 320, 330, 340 and 350). In an example embodiment, the blurring operation includes calculation of a blur length and a blur angle from the object parameters of the foreground regions. In this embodiment, the background image 370 is the same as that of the background image 370 of the composite image 300. As shown in FIG. 7, the foreground region 360 is kept intact and the foreground regions (710, 720, 730, 740 and 750) are modified to depict the significant speed of the moving object. However, it should be noted that the path guided luminosity integration may be performed on all foreground regions or some selective foreground regions or foreground regions may be modified in a particular pattern, for example, applying the path guided luminosity integration to alternate foreground regions such as regions 310, 330 and 350. In an alternate example embodiment, some or all of the foreground regions may be processed to generate a composite image such as the composite image 700 to represent moving object.

Figure 8:
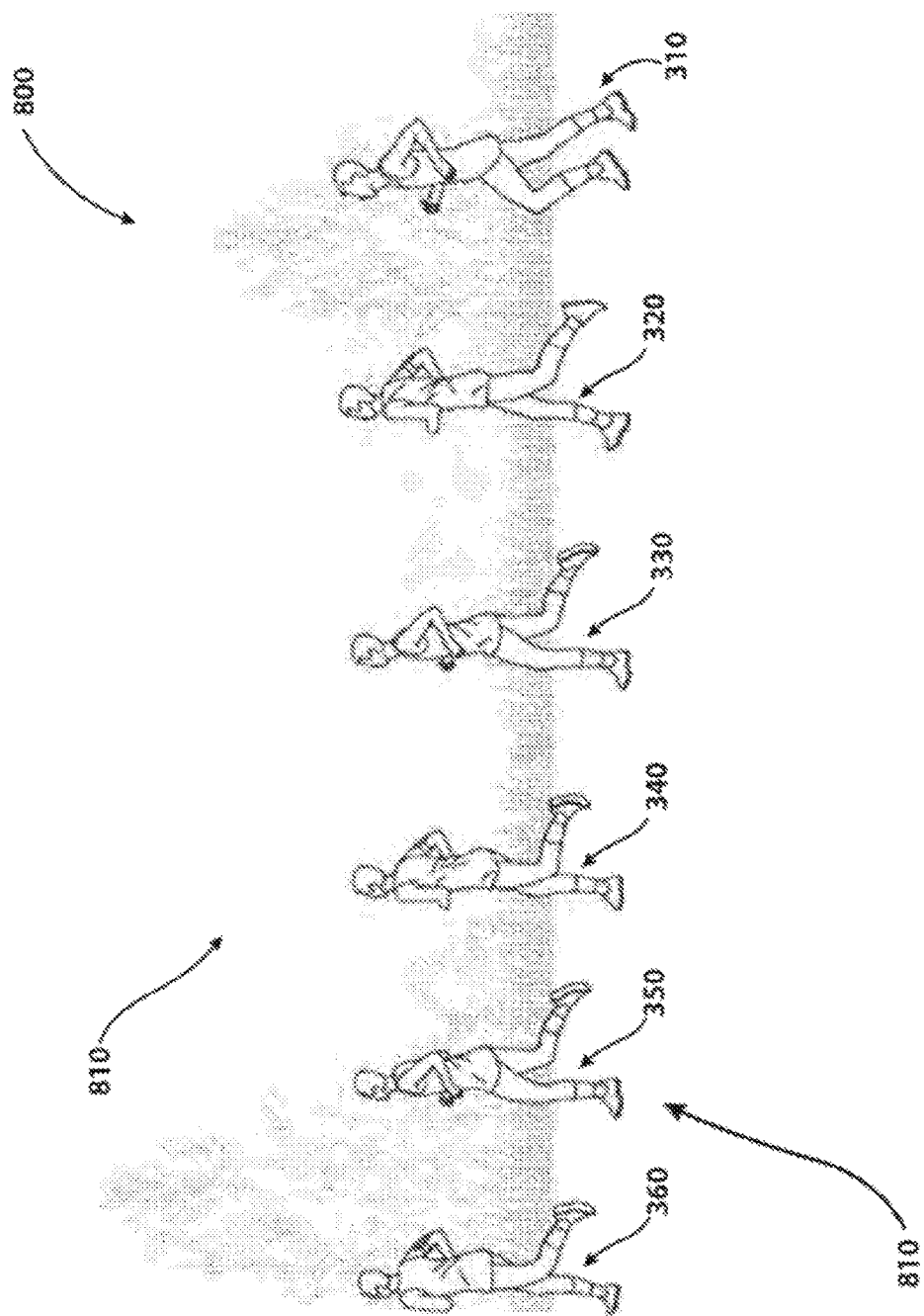
FIG. 8 illustrates an example representation of a composite image representing motion of objects, in accordance with another example embodiment.

FIG. 8 illustrates an example representation of a composite image 800 representing motion of objects, in accordance with another example embodiment. In this example embodiment, the background image 370 is modified. In this example embodiment, the foreground regions (310, 320, 330, 340, 350 and 360) are retained without modifications in the composite image 800. In an example embodiment, the background image 370 (generated from stationary objects classified as background regions) is blurred by suitable techniques to generate a modified background image 810. The modified background image 810, with the foreground regions (310, 320, 330, 340, 350 and 360) that are unchanged, emulate a camera moving alongwith a moving object (athlete). In an example embodiment, the background image 810 may be directionally blurred to represent the motion of the foreground regions (310, 320, 330, 340, 350 and 360) in the composite image 800. The modified background image 810 is combined with the foreground regions (310, 320, 330, 340, 350 and 360) that are unchanged to generate the composite image 800. As shown in FIG. 8, the background image 810 is completely blurred in comparison with the background image 370. However, background regions may be selectively modified to represent motion of the moving object. For example, only the path of the foreground region may be blurred in the background image instead of blurring the complete background image.

Figure 9:
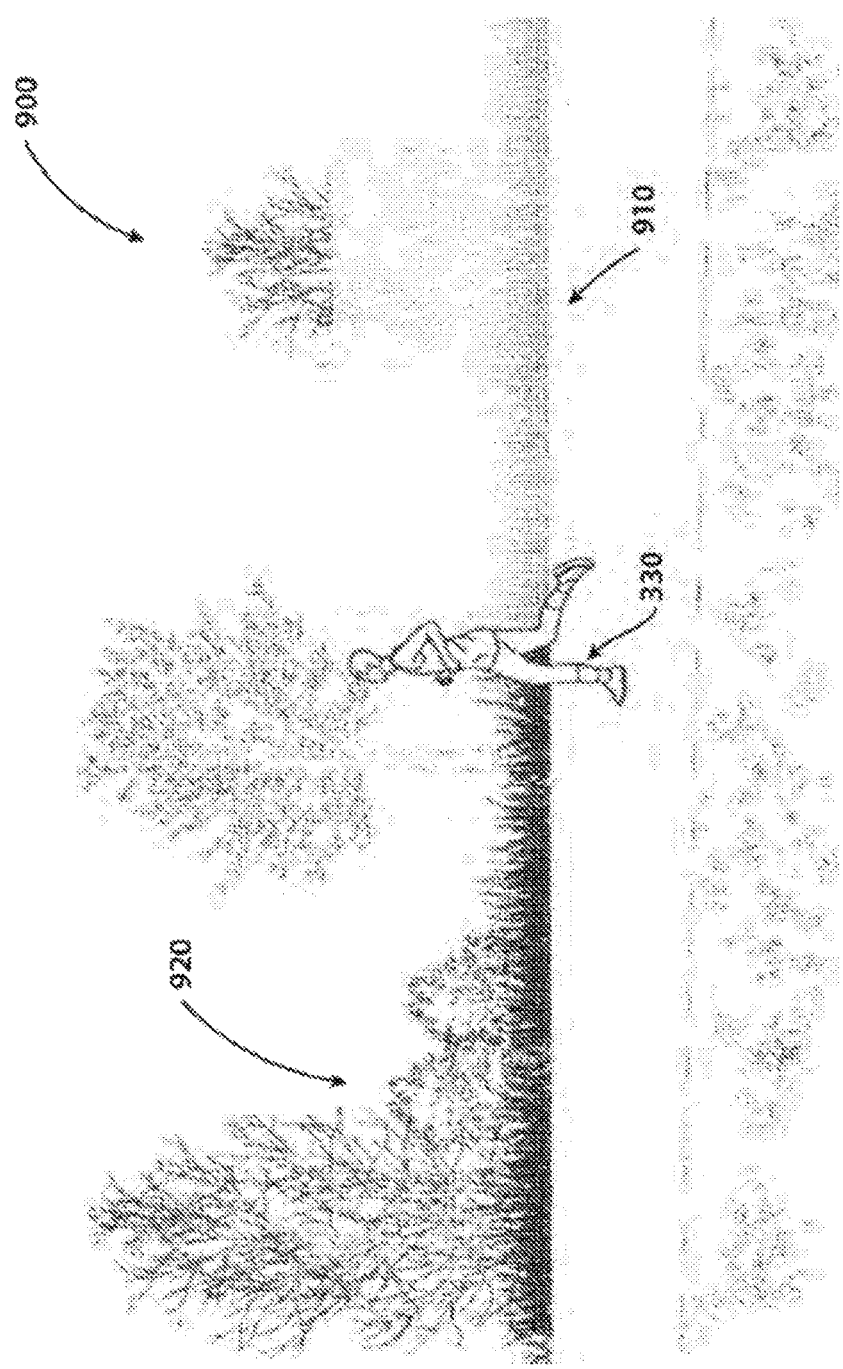
FIG. 9 illustrates an example representation of a composite image representing motion of objects, in accordance with another example embodiment.

FIG. 9 illustrates an example representation of a composite image 900 representing motion of objects, in accordance with an example embodiment. In an example embodiment, the background image 370, is selectively blurred to show a path 910 associated with the moving object (an athlete). In an example embodiment, object parameters associated with the foreground regions (310 and 320) are used to determine the path 910 of the moving object (the athlete, represented by the foreground region 330). The background image 370 is selectively blurred corresponding to the path 910 determined, to generate a modified background image 920. As shown in FIG. 9, only the path 910 associated with the background regions through which the foreground region 330 has moved is blurred to represent the modified background image 920 in the composite image 900, and rest of the foreground regions may not be used in generating the composite image 900. The modified background image 920 is combined with a foreground region (for example, 330) to generate the composite image 900. It should be noted that in this example embodiment, only one instance of moving object (for example, the foreground region 330) is shown in the composite image 900, and the instances of the moving object that are captured later (after the capture of the image having the foreground region 330) may not be used for generating the composite image 900. However, it should be noted that the foreground region 360 may also be shown to represent the moving object and the path behind the foreground region 360 (a part of the background image 370) may be blurred. In this example embodiment, the background image 920 that has been selectively blurred, shows an artistic representation of speed of the moving object (athlete). It should be noted that at least one object parameter obtained from more than one foreground regions may be used to determine the path 910. In another example embodiment, some or all of the foreground regions may be processed to generate a composite image such as the composite image 900 to represent the moving object.

Figure 10:
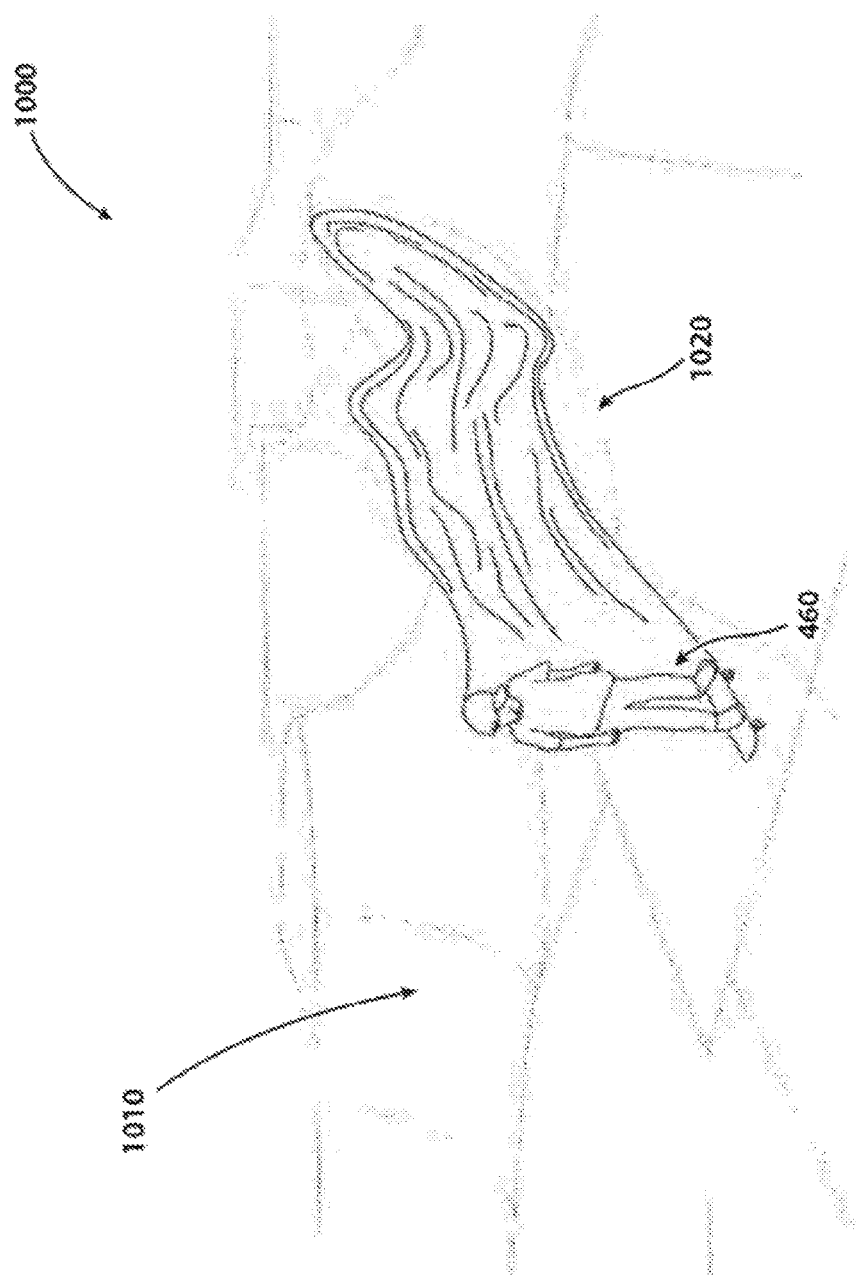
FIG. 10 illustrates an example representation of a composite image representing motion of objects, in accordance with another example embodiment.

FIG. 10 illustrates an example representation of a composite image 1000 representing motion of objects, in accordance with another example embodiment. In an example embodiment, foreground regions (410, 420, 430, 440 and 450) and the background image 470 are modified. In this example embodiment, foreground regions (410, 420, 430, 440 and 450) are replaced by a sample image 1020 in the background image 470, whereas one instance of the moving object (the skater) is represented by maintaining the foreground region (460) unchanged. In an example embodiment, the sample image is generated based on the object parameters determined from the foreground regions (410, 420, 430, 440 and 450). The composite image 1000 gives a viewer an artistic representation of motion of the moving object (skater, represented by the foreground region 460). In an example, foreground regions (410, 420, 430, 440 and 450) alongwith neighboring regions of the background image 470 may also be replaced by the sample image 1020 that results in a modified background image 1010. The modified foreground regions (410, 420, 430, 440 and 450) with an unchanged foreground region (460) is combined with the modified background image 1010 and the sample image 1020 to generate the composite image 1000. As shown in the FIG. 10, the foreground region 460 represents the moving object (skater), the sample image 1020 replaces the foreground regions (410, 420, 430, 440 and 450) and the neighboring regions of the foreground regions (410, 420, 430, 440 and 450) in the background image 1010. However, it should be noted that some selective foreground regions may be replaced or foreground regions may be replaced in a particular pattern, for example, replacing of alternate foreground regions.

Figure 11:
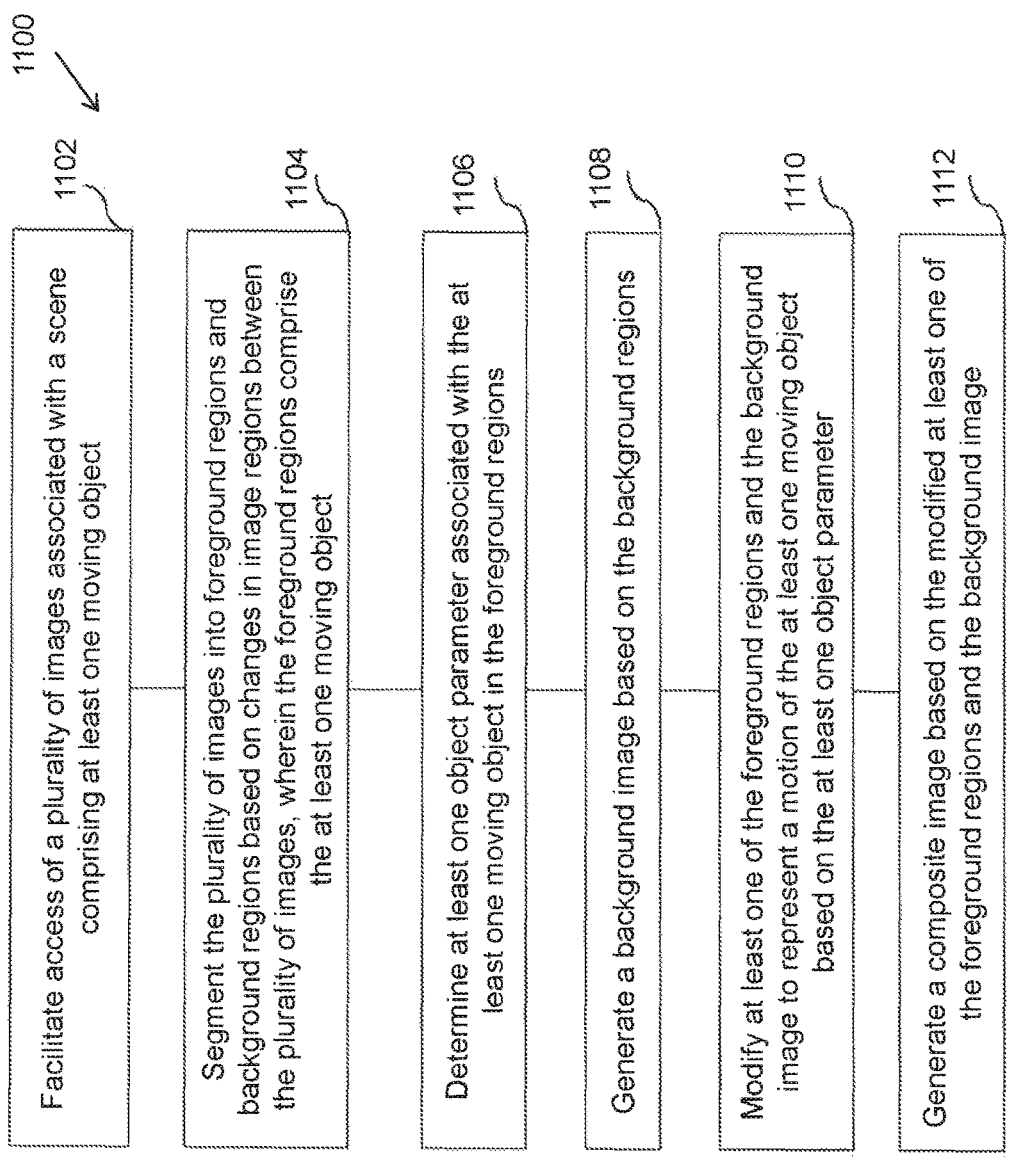
FIG. 11 is a flowchart depicting an example method for representing motion of objects in a composite image, in accordance with an example embodiment.

FIG. 11 is a flowchart depicting an example method 1100 for representing motion in a composite image, in accordance with an example embodiment. The method 1100 depicted in the flow chart may be executed by, for example, the apparatus 200 of FIG. 2.

At block 1102, the method 1100 includes facilitating access of a plurality of images associated with a scene, wherein the scene comprises at least one moving object. In an example embodiment, each of the plurality of images may represent a slightly different view of the scene as the at least one moving object may be present at different regions in the plurality of images. As described in reference to FIG. 2, the plurality of images may be received from a media capturing device having a camera module, or from external sources such as DVD, Compact Disk (CD), flash drive, memory card, or received from external storage locations through Internet, Bluetooth®, and the like.

At block 1104, the method 1100 includes segmenting the plurality of images into foreground regions and background regions based on changes in corresponding image regions between the plurality of images, wherein the foreground regions comprise the at least one moving object. In an example embodiment, the plurality of images are aligned before segmentation to adjust against any shift in the captured images due to hand movement or any similar undesired effects. In an example embodiment, segmentation of the plurality of images (for example, I1, I2, . . . , In) may be performed by matching corresponding regions in the images (I1, I2, . . . , In) by pixel matching and/or block wise matching. In an example embodiment, if the apparatus 200 determines that a region R2 in the image I1 comprises changes with respect to a corresponding region R2 in the image I2, the region R2 of the image I1 may be classified as foreground region, and rest of the regions in the image I1 may be classified as background region. It should be noted that the foreground regions and the background regions are determined for some or all of the images (I1, I2, . . . , In).

At block 1106, the method 1100 includes determining at least one object parameter associated with the at least one moving object in the foreground regions. In an example embodiment, at least one of parameters such as location of the at least one moving object and/or shape of the at least one moving object are determined from segmented foreground regions in the plurality of images. At block 1108, the method 1100 includes generating a background image based on the background regions. In an example embodiment, the background regions are combined to generate the background image.

At block 1110, the method 1100 includes modifying at least one of the foreground regions and the background image to represent a motion of the at least one moving object based on the at least one object parameter. For example, if there is at least one moving object in the plurality of images classified as a foreground region, the foreground region and/or the background image can be modified to represent motion. Various embodiments of modifying the foreground and/or background regions to represent motion in the composite image are described in reference to FIGS. 5 to 10.

At block 1112, the method 1100 includes generating a composite image based on the modified at least one of the foreground regions and the background image. In an example embodiment, the modified foreground regions and the modified background image are combined to form a composite image. The composite image represents motion of the at least one moving object. Various example embodiments of generating the composite images are further described in reference with FIGS. 12 to 17.

Figure 12:
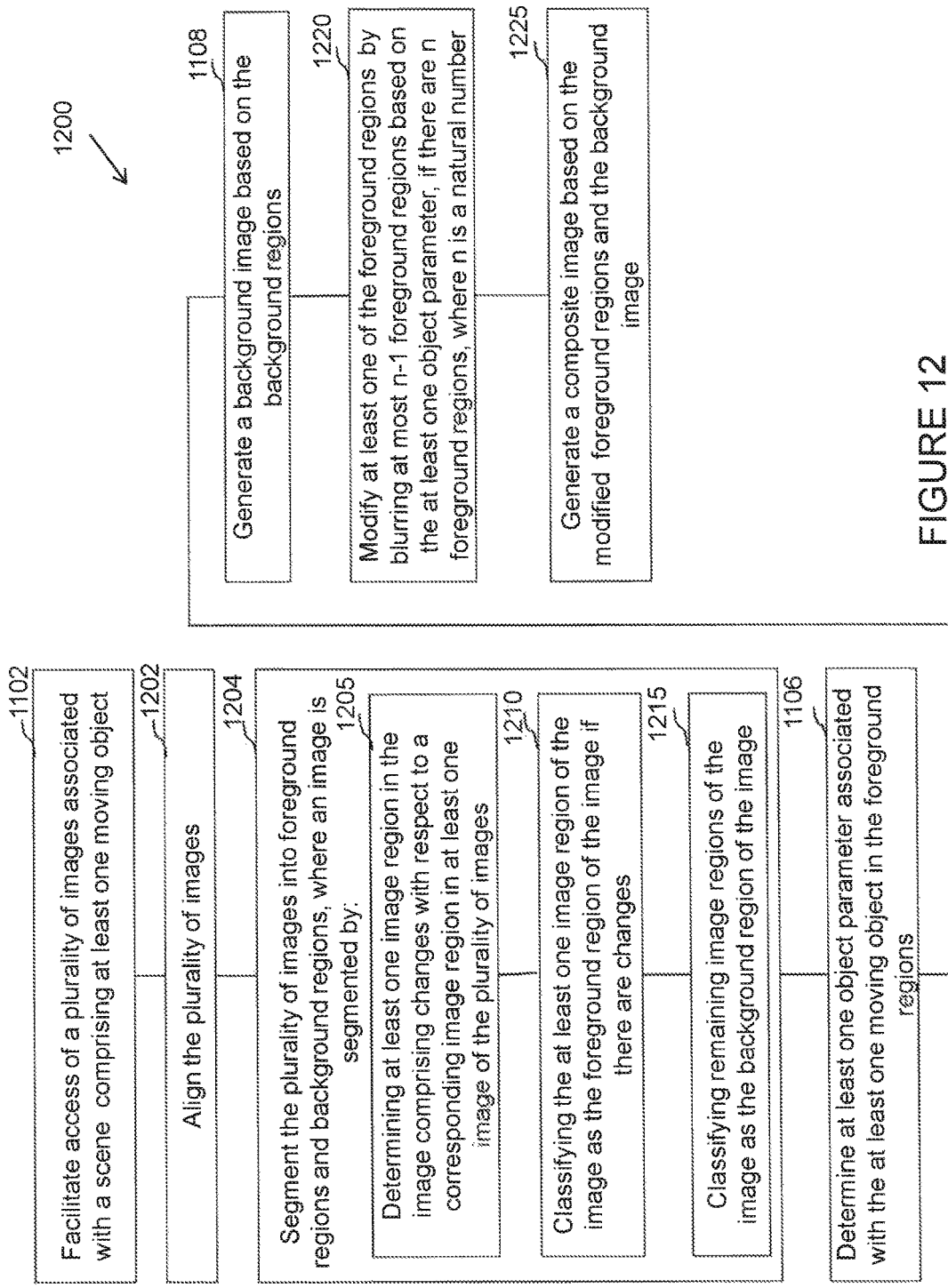
FIG. 12 is a flowchart depicting an example method for representing motion of objects in a composite image, in accordance with another example embodiment.

FIG. 12 is a flowchart depicting an example method 1200 for representing motion of objects in a composite image, in accordance with another example embodiment. The method 1200 depicted in the flow chart may be executed by, for example, the apparatus 200 of FIG. 2. The method 1200 includes the operations of the block 1102 of facilitating access of the plurality of the images (I1, I2, . . . , In) that are captured to depict at least one moving object in a scene. At block 1202, the method 1200 includes aligning the plurality of images (I1, I2, . . . , In). In an example embodiment, a number of point correspondences are determined between a pair of images, such as between images I1 and I2, between images I1 and I3, etc. In an example embodiment, based on the point correspondences, a transformation matrix may be determined between the image pairs (I1 and I2) and the pair of images (I1 and I2) may be aligned based on the determined transformation matrix. The operation of the block 1202 is repeated for the remaining images (I3, . . . , In) to align the plurality of images (I1, I2, . . . , In) to a common coordinate system. It should be noted that by aligning the plurality of images (I1, I2, . . . , In) to a common coordinate system, the background image of the plurality of images (I1, I2, . . . , In) are same and only thing that may differ between the plurality of images (I1, I2, . . . , In) are the foreground regions comprising at least one moving object.

At block 1204, the method 1200 includes performing segmentation of the plurality of images into foreground regions and background regions. The operation of the block 1204 may be an example of the operation of the block 1104 as described in reference to FIG. 11. In an example embodiment, the segmentation of the plurality of images may comprise segmenting plurality of aligned images. In an example embodiment, operation of the block 1204 is performed by performing operations of the blocks 1205, 1210 and 1215 for each of the images (I1, I2 . . . In). At block 1205, the method 1200 includes determining at least one image region in an image (for example, I1) comprising changes with respect to a corresponding image region in at least one remaining image of the plurality of images (I2, . . . , In). For example, a region R2 in an image I1 and a corresponding region R2 in other images such as images (I2, I3 . . . , In) are compared. In this example, it may be determined that the region R2 of the image I1 and region R2 in the image I2 does not match. Accordingly, the image R2 may be determined as the at least one region in the image I1 that has changes with respect to other images. Similarly, the at least one image region having changes with respect to other images are also determined for other images (I2, I3 . . . , In).

At 1210, the method 1200 includes classifying the at least one image region of the image as the foreground region of the image if there are changes in the at least one image region. In an example embodiment, the apparatus 200 may classify the region R2 as the foreground region in the image I1. In an example, the region R3 may be classified as a foreground region in the image I2, and a region R6 may be classified as a foreground region in the image I3, and so on. At 1215, the method 1200 includes classifying remaining image regions of the image as background regions of the image. For example, regions other than the region R2 in the image I1 that do not change in comparison with corresponding regions of other images may be classified as the background regions. It should be noted that the background regions for some or all of the remaining images (for example, images I2, I3 . . . , In) are classified.

The method 1200 also includes the operations of the block 1106 and 1108 (as described in reference to FIG. 11) that may be executed by the apparatus 200, to determine object parameters associated with the foreground regions, and to generate a background image from the background regions. At block 1220, the method 1200 includes modifying the foreground regions by selectively blurring at most n−1 foreground regions, if there are n foreground regions associated with the plurality of images (where n is a natural number). One example of the selective blurring is shown and described in reference to FIG. 5. For instance, if there are 6 foreground regions comprising the moving object classified as foreground regions, five foreground regions may be blurred while maintaining only one foreground region to represent the moving object. In an example embodiment, the foreground regions are blurred directionally to depict motion. At block 1225, the foreground regions that are modified, are combined with the background image, to generate a composite image that represents a motion of the moving object.

Figure 13:
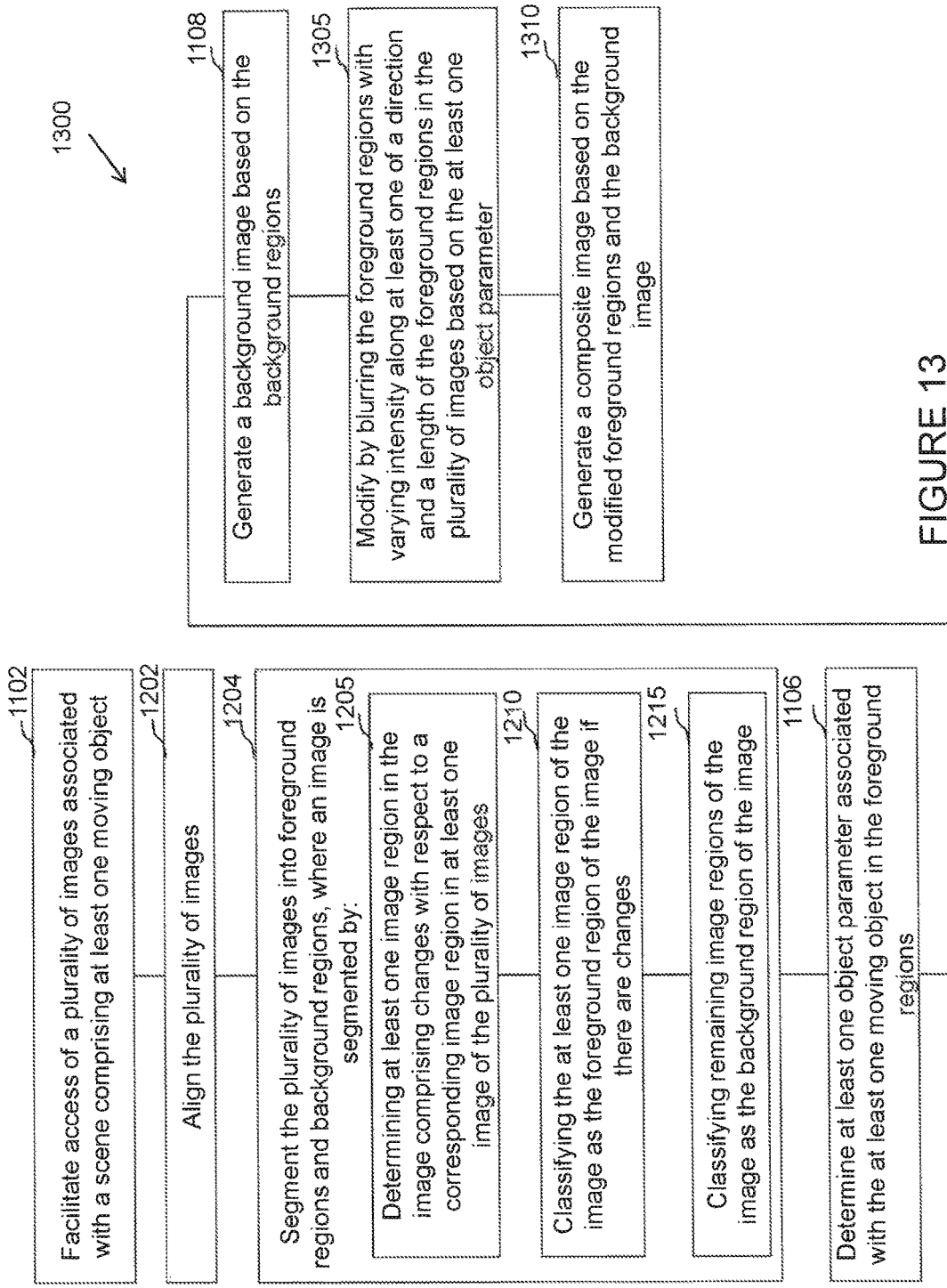
FIG. 13 is a flowchart depicting an example method for representing motion of objects in a composite image, in accordance with another example embodiment.

FIG. 13 is a flowchart depicting an example method 1300 for representing motion of objects in a composite image, in accordance with another example embodiment The method 1300 includes the operations of the blocks 1102, 1202, 1204, 1106 and 1108 as described in reference to FIG. 12. For instance, these blocks perform operations such as, facilitating access of a plurality of images associated with a scene comprising at least one moving object; aligning the plurality of images; segmenting the plurality of images into foreground regions and background regions; determining at least one object parameter associated with the at least one moving object in the foreground regions; and generating a background image based on the background regions.

At block 1305, the method 1300 includes modifying, by varying an intensity of blurring based on at least one of a direction and a length of the foreground regions in the plurality of images (I1, I2, . . . , In). In an example embodiment, if a moving object (O1) is of a length L1 in an image I1 and of a length L2 in an image I2 and if the intensity of blurring depends on the length of the moving object in the images (for example, blurring intensity increases with increase in the length of the moving object), foreground region corresponding to the moving object O1 may be blurred more in the image I1 as compared to the image I2. Such example of blurring the foreground regions with varying intensity based on the direction and the length is shown and described in reference to FIG. 6. At block 1310, the method 1300 includes generating a composite image based on the modified foreground regions, and the background image that remains unchanged. For instance, the foreground regions that are blurred with varying intensity are combined with the background image (generated from the background regions) to generate the composite image.

Figure 14:
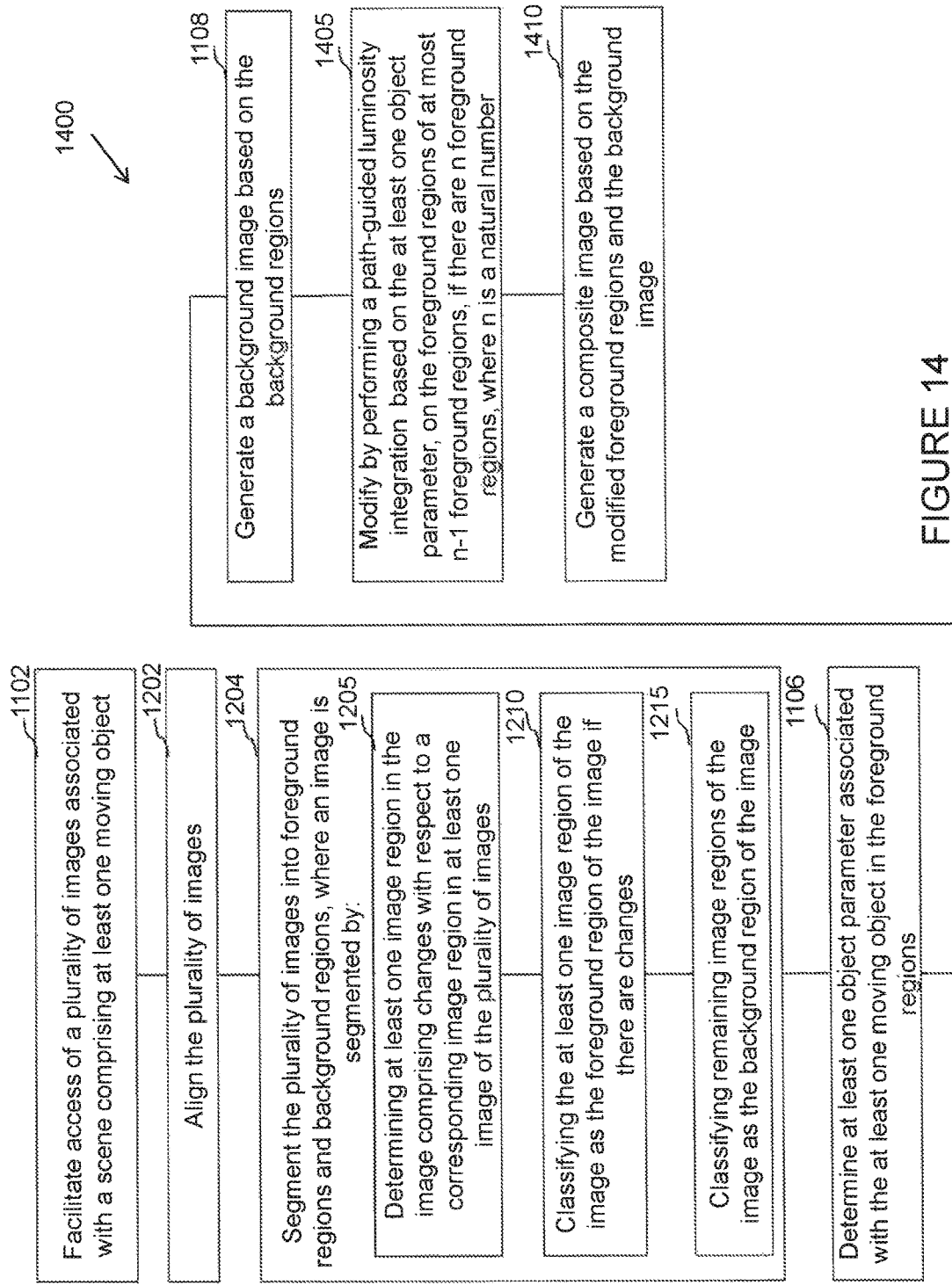
FIG. 14 is a flowchart depicting an example method for representing motion of objects in a composite image, in accordance with another example embodiment.

FIG. 14 is a flowchart depicting an example method 1400 for representing motion of objects in a composite image, in accordance with another example embodiment. The method 1400 includes the operations of the blocks 1102, 1202, 1204, 1106 and 1108 as described in reference to FIG. 12. For instance, these blocks perform operations such as, facilitating access of a plurality of images associated with a scene comprising at least one moving object; aligning the plurality of images; segmenting the plurality of images into foreground regions and background regions; determining at least one object parameter associated with the at least one moving object in the foreground regions; and generating a background image based on the background regions.

At block 1405, the method 1400 includes modifying the foreground regions by performing a path-guided luminosity integration on at most n−1 foreground regions, if there are n foreground regions associated with the plurality of image (where n is a natural number). As described in reference to FIG. 7, foreground regions are modified by performing a luminosity integration on the path of the at least one moving object using a luminosity function. In an example embodiment, the path guided luminosity integration may be performed with at least one of the foreground regions and retaining a foreground region without modification, to generate at least one foreground region displaying significant speed. In another example embodiment, the significant speed of the at least one moving object may also be shown by highly blurring the foreground regions by adjusting parameters of a blur function based on object parameters. It should be noted that such blurring operations are performed using an apparatus, such as the apparatus 200 based on the object parameters associated with the foreground regions. At block 1410 of the method 1400 includes generating a composite image based on the modified foreground regions and the background image that is retained without modification. The foreground regions that are modified by applying the path guided luminosity integration are combined with the background image (generated from the background regions) to generate the composite image.

Figure 15:
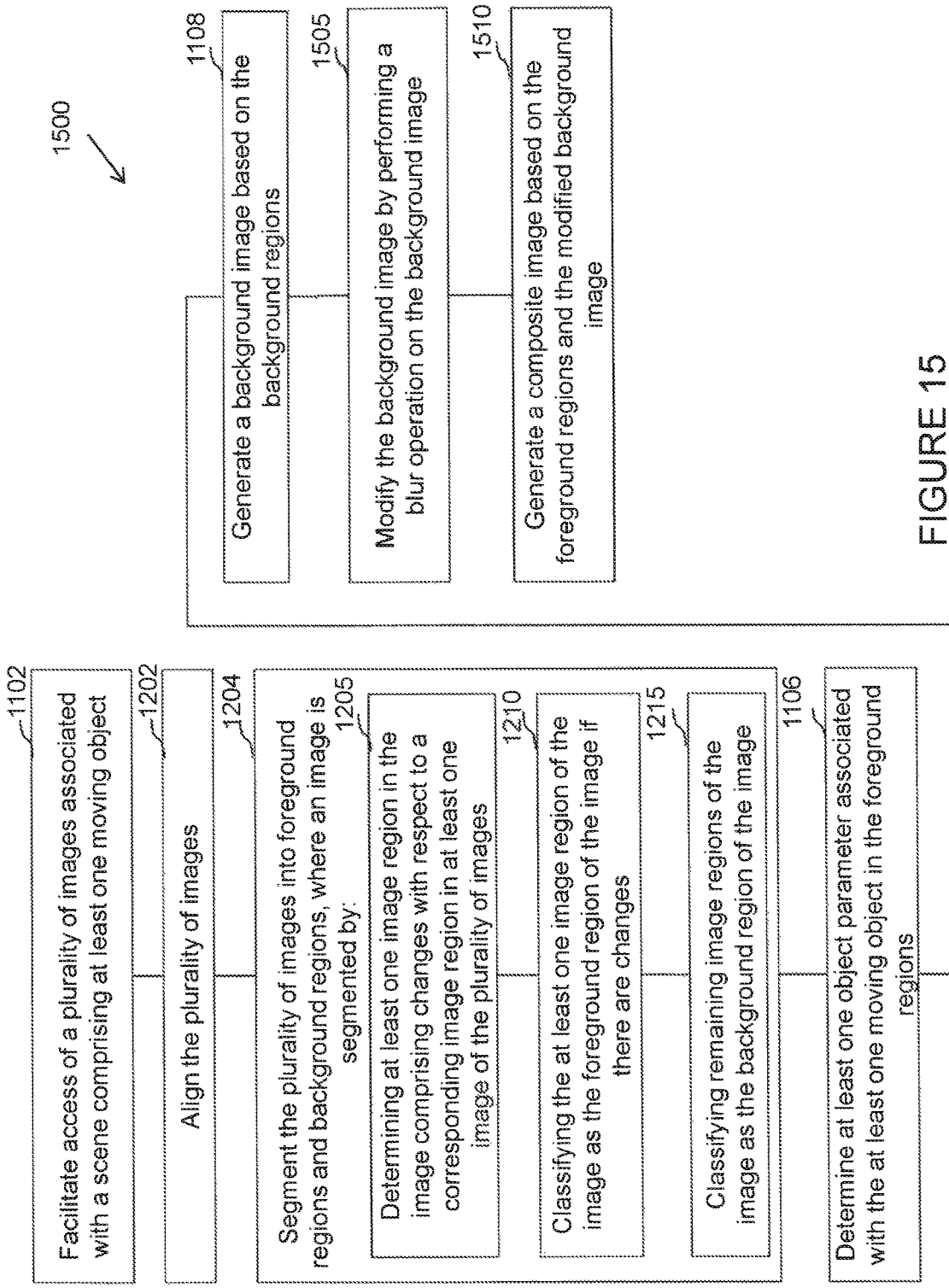
FIG. 15 is a flowchart depicting an example method for representing motion of objects in a composite image, in accordance with another example embodiment.

FIG. 15 is a flowchart depicting an example method 1500 for representing motion of objects in a composite image, in accordance with another example embodiment. The method 1500 includes the operations of the blocks 1102, 1202, 1204, 1106 and 1108 as described in reference to FIG. 12. For instance, these blocks perform operations such as, facilitating access of a plurality of images associated with a scene comprising at least one moving object; aligning the plurality of images; segmenting the plurality of images into foreground regions and background regions; determining at least one object parameter associated with the at least one moving object in the foreground regions; and generating a background image based on the background regions.

At block 1505, the method 1500 includes modifying the background image by performing a blur operation on the background image. In an example embodiment, the background image is blurred and the foreground regions are unchanged to represent motion of the at least one moving object. Such example of blurring the background image is shown and explained with reference to FIG. 8. In an example embodiment, blurring of the background image and retaining the foreground regions (represented by the at least one moving object), emulates a camera moving alongwith the at least one moving object. At block 1510, the method 1500 includes generating a composite image based on the foreground regions and the modified background image. The background image is modified by performing a blur operation is combined with the foreground regions that are unchanged to generate the composite image.

Figure 16:
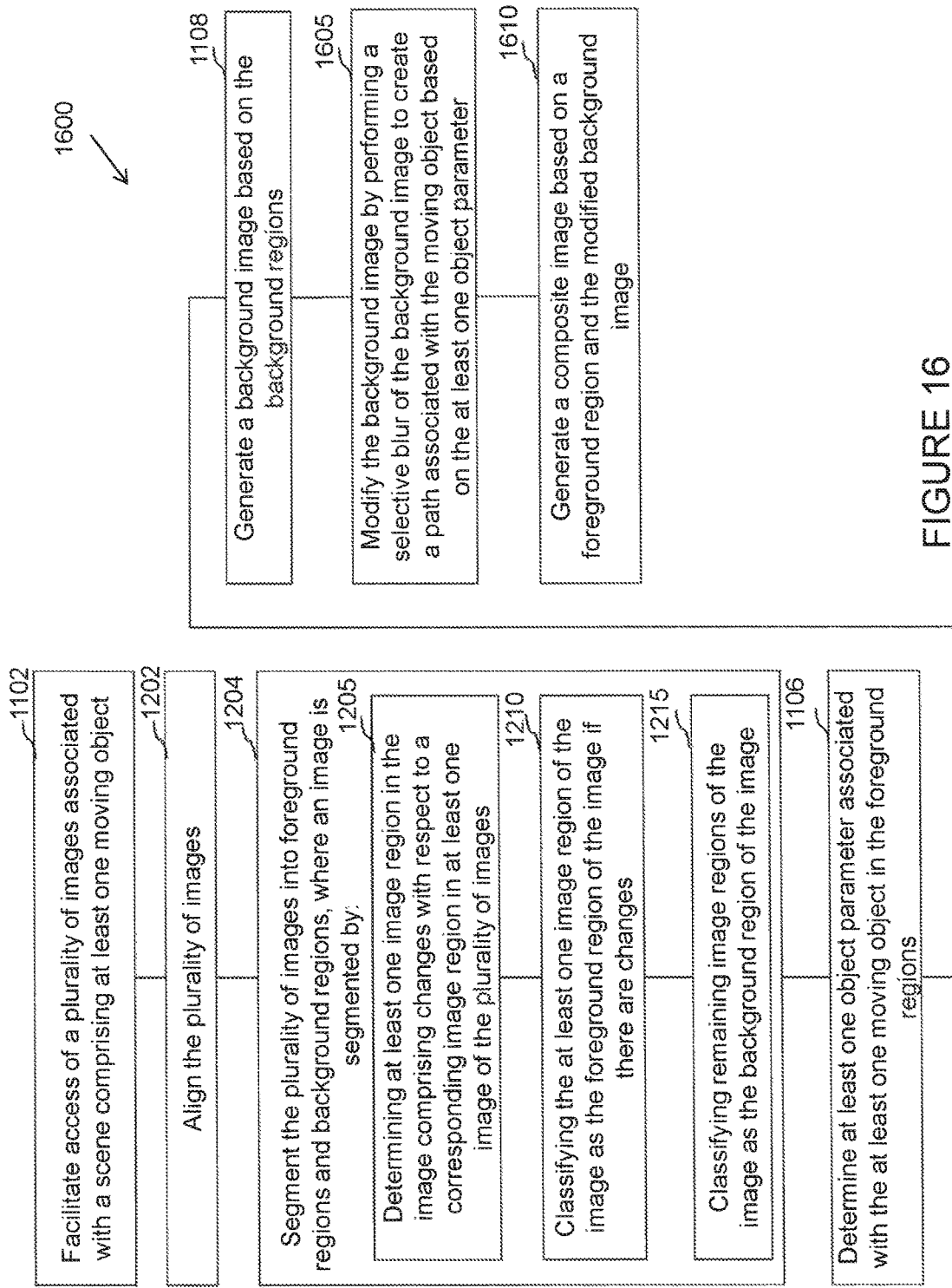
FIG. 16 is a flowchart depicting an example method for representing motion of objects in a composite image, in accordance with another example embodiment.

FIG. 16 is a flowchart depicting an example method 1600 for representing motion of objects in a composite image, in accordance with another example embodiment. The method 1600 includes the operations of the blocks 1102, 1202, 1204, 1106 and 1108 as described in reference to FIG. 12. For instance, these blocks perform operations such as, facilitating access of a plurality of images associated with a scene comprising at least one moving object; aligning the plurality of images; segmenting the plurality of images into foreground regions and background regions; determining at least one object parameter associated with the at least one moving object in the foreground regions; and generating a background image based on the background regions.

At block 1605, the method 1600 includes modifying the background image by performing a selective blur of the background image to create a path associated with the at least one moving object. In an example embodiment, the path of the at least one moving object is determined from object parameters associated with the at least one moving object in the foreground regions. The background image is modified by blurring the path associated with the at least one moving object, in the background image. Such selective blurring of the background image, gives an artistic visualization of speed. An example of such selective blurring of the background image is shown and described in reference to FIG. 9. It should be noted that in this example embodiment, only one instance of the moving object (for example, the foreground region 330) is shown in the composite image 900, and the instances of the moving object that are captured later (after the capture of the image having the foreground region 330) may not be used for the generation of the composite image 900. At block 1610, the method 1600 includes generating a composite image based on the modified at least one of the foreground regions and the background image. For instance, the modified background image modified by applying a selective blur operation on the path of the at least one moving object (represented by the foreground region) is combined with one foreground region to generate the composite image.

Figure 17:
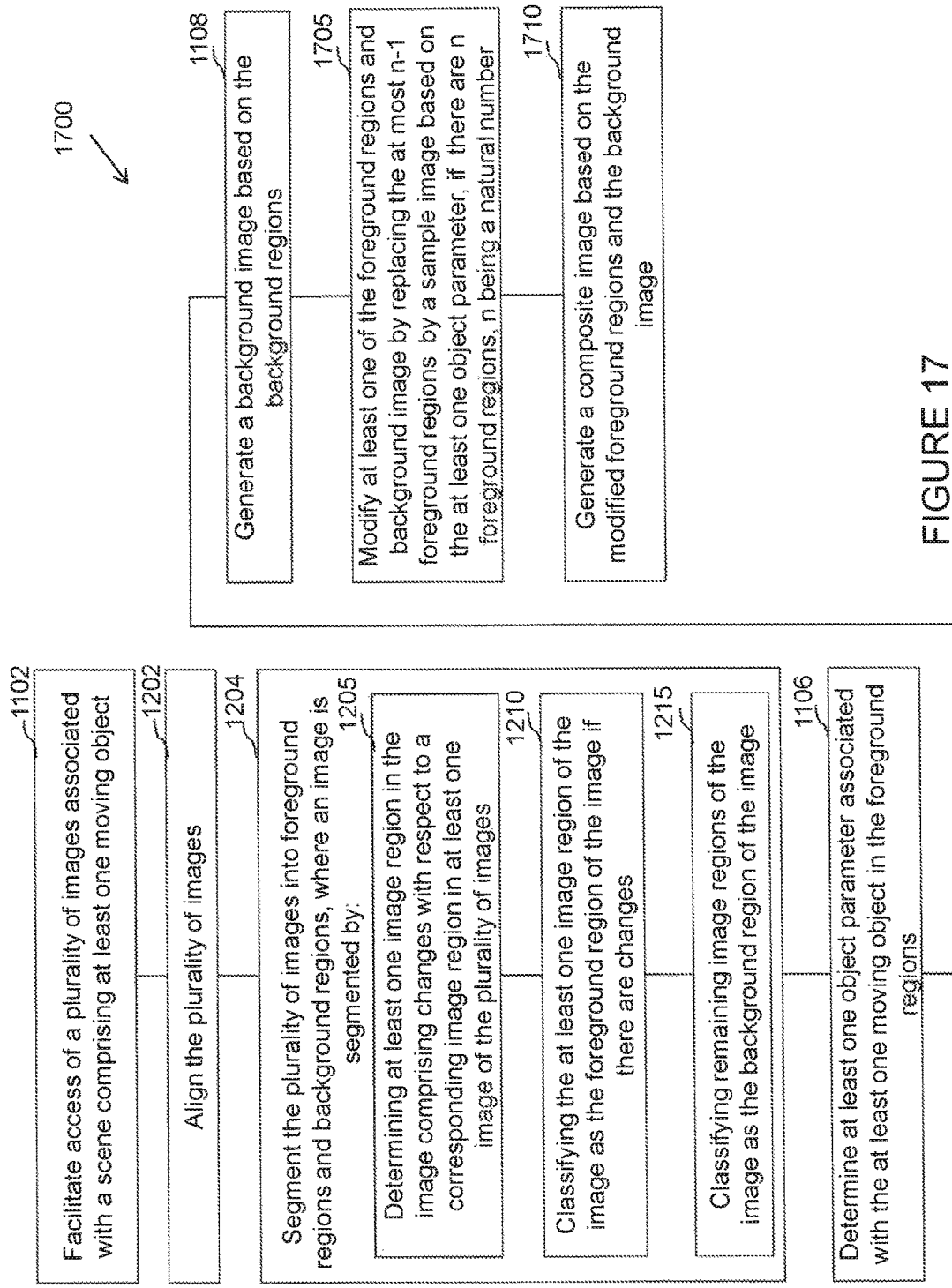
FIG. 17 is a flowchart depicting an example method for representing motion of objects in a composite image, in accordance with another example embodiment.

FIG. 17 is a flowchart depicting an example method 1700 for representing motion of objects in a composite image, in accordance with another example embodiment The method 1700 includes the operations of the blocks 1102, 1202, 1204, 1106 and 1108 as described in reference to FIG. 12. For instance, these blocks perform operations such as, facilitating access of a plurality of images associated with a scene comprising at least one moving object; aligning the plurality of images; segmenting the plurality of images into foreground regions and background regions; determining at least one object parameter associated with the at least one moving object in the foreground regions; and generating a background image based on the background regions.

At block 1705, the method 1700 includes modifying at least one of the foreground regions and the background image by replacing at most n−1 foreground regions by a sample image, if there are n foreground regions associated with the plurality of images (I1, I2, . . . , In). For example, instead of repetitively displaying foreground regions to indicate a path of the at least one moving object, the sample image replaces the foreground regions (obtained by segmenting the plurality of images), as described with reference to FIG. 10. The sample image may be obtained from a procedurally generated program and replaces the foreground regions based on the object parameters determined from the foreground regions. Alternatively, the foreground regions and/or the background image are modified to give a cartoonish effect of speed. At block 1710, the method 1700 includes generating a composite image based on modified foreground regions and a modified background image. The background image and some of the foreground regions (that are modified by replacing the foreground regions by the sample image) are combined to generate the composite image.

It should be noted that to facilitate discussions of the flowcharts of FIGS. 11 to 17, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 1100 to 1700 are performed in an automated fashion. These operations involve substantially no interaction with the user. Other operations of the methods 1100 to 1700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to represent motion in a composite image. Various embodiments provide methods for modifying foreground regions and/or background image, where various object parameters determined for a moving object are used after segmenting the plurality of images, to represent motion in a composite image. In various embodiments, the foreground regions and/or background image are modified to represent a sequence of images taken over a period in a single composite image. Such modifications performed on the foreground regions and/or background region enhance the visualization of an image to the viewer for representing the motion of the moving object.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   facilitating access of a plurality of images associated with a scene, the scene comprising at least one moving object;
   segmenting the plurality of images into foreground regions and background regions based on a change in corresponding image regions between the plurality of images, wherein the foreground regions comprise the at least one moving object, wherein segmenting the plurality of images comprises segmenting an image of the plurality of images by:
      determining at least one image region in the image comprising a change with respect to a corresponding image region in at least one other image of the plurality of images;
      classifying the at least one image region of the image as the foreground region of the image if there is a change in the at least one image region; and
      classifying a remaining image region of the image as the background region of the image;
   determining at least one object parameter associated with the at least one moving object in the foreground regions;
   generating a background image by grouping one or more background regions;
   modifying at least one of the foreground regions and the background image to represent a motion of the at least one moving object based on the at least one object parameter; and
   generating a composite image based on the at least one modified foreground regions and the background image.

2. The method as claimed in claim 1, further comprising aligning the plurality of images.

3. The method as claimed in claim 1, wherein the at least one object parameter associated with the at least one moving object comprises one or more of a location of the at least one moving object and a shape of the at least one moving object.

4. The method as claimed in claim 1, wherein the modifying comprises blurring at most n−1 foreground regions, if there are n foreground regions associated with the plurality of images, where n is a natural number.

5. The method as claimed in claim 1, wherein the modifying the at least one of the foreground regions comprises performing an extreme motion blur emulation on at most n−1 foreground regions, if the foreground regions comprises n foreground regions, where n is a natural number.

6. The method as claimed in claim 1, wherein the modifying the background image comprises performing a blur operation on the background image.

7. The method as claimed in claim 1, wherein the modifying the background image comprises performing a selective blur of the background image to create a path associated with the moving object.

8. The method as claimed in claim 7, wherein the path of the at least one moving object is determined based on the object parameters of the plurality of images.

9. The method as claimed in claim 1, wherein the modifying the at least one of the foreground regions comprises replacing at most n−1 foreground regions by a sample image, if the foreground regions comprises n foreground regions, where n is a natural number.

10. An apparatus comprising:
    at least one processor; and
    at least one memory comprising computer program code, the at least one memory and the computer program code configured to, with the at least one processor, cause the apparatus to at least perform:
       facilitate access of a plurality of images associated with a scene, the scene comprising at least one moving object;
       segment the plurality of images into foreground regions and background regions based on a change in corresponding image regions between the plurality of images, wherein foreground regions comprise the at least one moving object, wherein an image of the plurality of images is segmented by:
          determining at least one image region in the image comprising a change with respect to a corresponding image region in at least one other image of the plurality of images;
          classifying the at least one image region of the image as the foreground region of the image if there is a change in the at least one image region; and
          classifying a remaining image region of the image as the background region of the image;
       determine at least one object parameter associated with the at least one moving object in the foreground regions;
       generate a background image by grouping one or more background regions;

modify at least one of the foreground regions and the background image to represent a motion of the at least one moving object based on the at least one object parameter; and generate a composite image based on the modified at least one of the foreground regions and the background image.

11. The apparatus as claimed in claim 10, wherein the apparatus is further caused, at least in part, to align the plurality of images.

12. The apparatus as claimed in claim 10, wherein the at least one object parameter associated with the at least one moving object comprises one or more of a location of the at least one moving object and a shape of the at least one moving object.

13. The apparatus as claimed in claim 10, wherein to modify the at least one of the foreground regions, the apparatus is further caused, at least in part to blur at most n−1 foreground regions, if foreground regions comprises n foreground regions, where n is a natural number.

14. The apparatus as claimed in claim 10, wherein to modify the at least one of the foreground regions, the apparatus is further caused, at least in part to perform extreme motion blur emulation of at most n−1 foreground regions, if the foreground regions comprises n foreground regions, where n is a natural number.

15. The apparatus as claimed in claim 10, wherein to modify the background image, the apparatus is further caused, at least in part to perform a blur operation on the background image.

16. The apparatus as claimed in claim 10, wherein to modify the background image, the apparatus is further caused, at least in part to perform a selective blur of the background image to create a path associated with the moving object.

17. The apparatus as claimed in claim 16, wherein the apparatus is further caused, at least in part to determine the path of the at least one moving object based on the object parameters of the plurality of images.

18. The apparatus as claimed in claim 10, wherein to modify the at least one of the foreground regions, the apparatus is further caused, at least in part to replace at most n−1 foreground regions by a sample image, if the foreground regions comprises n foreground regions, where n is a natural number.

19. A computer program product comprising at least one non-transitory computer-readable storage medium, the non-transitory computer-readable storage medium comprising a set of instructions, which, when executed by one or more processors, cause an apparatus to at least perform:

facilitate access of a plurality of images associated with a scene, the scene comprising at least one moving object;

segment the plurality of images into foreground regions and background regions based on changes in corresponding image regions between the plurality of images, wherein foreground regions at least comprise the at least one moving object, wherein an image of the plurality of images is segmented by:

determining at least one image region in the image comprising a change with respect to a corresponding image region in at least one other image of the plurality of images;

classifying the at least one image region of the image as the foreground region of the image if there is a change in the at least one image region; and classifying a remaining image region of the image as the background region of the image;

determine at least one object parameter associated with the at least one moving object in the foreground regions;

generate a background image by grouping one or more background regions;

modify at least one of the foreground regions and the background image to represent a motion of the at least one moving object based on the at least one object parameter; and generate a composite image based on the modified at least one of the foreground regions and the background image.

* * * * *